United States Patent
Takahashi et al.

(10) Patent No.: US 6,894,870 B2
(45) Date of Patent: May 17, 2005

(54) THIN FILM MAGNETIC HEAD COMPRISING AT LEAST TWO COIL LAYERS AND METHOD OF MANUFACTURING THE SAME

(75) Inventors: Toru Takahashi, Niigata-ken (JP); Hisayuki Yazawa, Niigata-ken (JP); Kiyoshi Kobayashi, Niigata-ken (JP); Hideki Gochou, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 200 days.

(21) Appl. No.: 10/008,019

(22) Filed: Nov. 5, 2001

(65) Prior Publication Data

US 2002/0054460 A1 May 9, 2002

(30) Foreign Application Priority Data

Nov. 8, 2000 (JP) ......................................... 2000-340279

(51) Int. Cl.⁷ ............................. G11B 5/17; G11B 5/127
(52) U.S. Cl. ....................................... 360/123; 360/126
(58) Field of Search ............................... 360/125, 126, 360/317, 123

(56) References Cited

U.S. PATENT DOCUMENTS

| 5,065,270 A | * 11/1991 | Koyanagi et al. ........... 360/123 |
| 5,155,646 A | * 10/1992 | Fujisawa et al. ............ 360/126 |
| 5,966,800 A | 10/1999 | Huai et al. |
| 6,008,969 A | * 12/1999 | Imai et al. .................. 360/126 |
| 6,032,353 A | 3/2000 | Hiner et al. |
| 6,166,880 A | 12/2000 | Kobayashi et al. |
| 6,320,726 B1 | * 11/2001 | Sasaki ......................... 360/126 |
| 6,483,665 B1 | * 11/2002 | Sasaki ......................... 360/126 |
| 6,538,846 B1 | * 3/2003 | Sato ........................... 360/126 |
| 6,560,068 B1 | * 5/2003 | Sasaki ......................... 360/126 |
| 6,643,095 B1 | * 11/2003 | Sasaki ......................... 360/126 |
| 6,646,828 B1 | * 11/2003 | Sasaki ......................... 360/126 |
| 2002/0048115 A1 | * 4/2002 | Sasaki et al. ............... 360/126 |

FOREIGN PATENT DOCUMENTS

JP            04356710 A    * 12/1992    ............ G11B/5/31

* cited by examiner

Primary Examiner—William J. Klimowicz
(74) Attorney, Agent, or Firm—Brinks Hofer Gilson & Lione

(57) ABSTRACT

The present invention provides a structure in which the coil center of a first coil layer is formed on a planarized surface, a first contact portion is formed by plating on the coil center, and the coil center of a second coil layer is conductively connected to the upper surface of the first contact portion. This structure can exhibit a stable DC resistance value and good conductivity.

27 Claims, 17 Drawing Sheets

THIN FILM MAGNETIC HEAD COMPRISING AT LEAST TWO COIL LAYERS AND METHOD OF MANUFACTURING THE SAME

BACKGROUND OF THE INVENTION

1. Field of the Invention

The present invention relates to a thin film magnetic head comprising two coil layers formed between core layers, and particularly to a thin film magnetic head capable of improving stability of a DC resistance value between the two coil layers and maintaining good conductivity between the two coil layers, and a method of manufacturing the magnetic head.

2. Description of the Related Art

A magnetic head device mounted on a hard disk device or the like comprises a thin film magnetic head formed on the trailing-side end surface of a slider and comprising, for example, a reproducing MR head and a recording inductive head.

The inductive head comprises lower and upper core layers each made of a magnetic material, and a coil layer for inducting each of the core layers so that a magnetic signal is recorded on a recording medium such as a hard disk or the like by a leakage magnetic field from a gap layer between both core layers.

The structure of the thin film magnetic head is improved many times for complying with a narrower track with increases in the recording density in future. FIG. 24 is a longitudinal sectional view showing an example of the thin film magnetic element.

In FIG. 24, reference numeral 1 denotes a lower core layer made of a magnetic material such as permalloy or the like. In the surface facing a recording medium, a pole portion 6 comprising a lower pole layer 2, a gap layer 4 and an upper pole layer 5 is formed. As shown in FIG. 24, a Gd-determining insulating layer 10 is formed between the lower core layer 1 and the pole portion 6 so as to be located behind the surface facing the recording medium in the height direction.

As shown in FIG. 24, a coil insulating under layer 11 is formed on the lower core layer 1, and a first coil layer 12 is formed on the coil insulating underlying layer 11. Assuming that the upper surface of the upper pole layer 5 is a reference plane A, the upper surface of the first coil layer 12 is lower than the reference plane A. Furthermore, a coil insulating layer 15 is formed on the first coil layer 12 so that the upper surface of the coil insulating layer 15 and the reference plane A lie in the same plane.

As shown in FIG. 24, the coil center 12a of the first coil layer 12 is behind, in the height direction (the Y direction shown in the drawing), a back gap layer 13 made of a magnetic material and formed on the lower core layer 1.

Also, a raised layer 14 is formed below the coil center 12a with the coil insulating underlying layer 11 provided therebetween. The upper surface of the coil center 12a is formed at a position higher than the upper surface of the conductor of the first coil layer 12 due to the presence of the raised layer 14. Referring to FIG. 24, the upper surface 12b of the coil center 12a and the reference plane A lie in the same plane so that the upper surface 12b is exposed from the upper surface of the coil insulation layer 15.

In this thin film magnetic head, a second coil layer 16 is spirally formed on the coil insulating layer 15. As shown in FIG. 24, the coil center 16a of the second coil layer 16 is conductively connected directly to the coil center 12a of the first coil layer 12 which is exposed from the upper surface of the coil insulating layer 15.

Also, as shown in FIG. 24, the second coil layer 16 is covered with an insulating layer 17 made of an organic insulating material. Furthermore, the upper pole layer 5, the insulating layer 17 and the back gap layer 13 are coated with an upper core layer 18 formed by, for example, a frame plating method.

As described above, the thin film magnetic head shown in FIG. 24 has a structure adaptable to a narrower track, but a coil layer having a two-layer structure enables a decrease in the width dimension of the first coil layer 12 formed between the pole portion 6 and the back gap layer 13, as compared with a coil layer having a single-layer structure. Therefore, the length from the tip 18a of the upper core layer 18 to the base end 18b can be shortened to shorten the magnetic path from the upper core layer 18 to the lower core layer 1, thereby decreasing the inductance of the inductive head.

FIGS. 25 to 27 are drawings showing the steps of a method of forming the raised layer 14 on the lower core layer 1 and forming the coil center 12a of the first coil layer 12 on the raised layer 14.

In FIG. 25, a resist material is coated on the lower core layer 1, and then cured by heat treatment to form the raised layer 14. Also, the coil insulating under layer 11 is formed on the lower core layer 1 and the raised layer 14. Furthermore, a plating under layer 21 is formed on the coil insulating under layer 11.

Next, in FIG. 26, a resist layer 19 is formed on the coil insulating under layer 11, and an aperture pattern 20 is formed in the resist layer 19 above the raised layer 14 by exposure and development, for forming the coil center 12a of the first coil layer 12.

Then, the coil center 12a of the coil layer 12 is formed in the aperture pattern 20 by plating.

In FIG. 27, after the resist layer 19 is removed, the plating under layer 21 is removed except the portion of the plating under layer 21 formed below the coil center 12a. Then, the coil insulating layer 15 made of alumina or the like is formed on the coil insulating under layer 11 and the coil center 12a, and the upper surface of the coil insulating layer 15 is polished by a CMP technique. In this step, the coil insulating layer 15 is polished up to, for example, B—B line coplanar with the reference plane A shown in FIG. 24 to expose the upper surface of the coil center 12a of the first coil layer 12 from the upper surface of the coil insulating layer 15.

However, the structure for conductively connecting the coil center 12a of the first coil layer 12 formed on the raised layer 14 to the coil center 16a of the second coil layer 16 has the following problems.

The polishing step shown in FIG. 27 causes a difficulty in forming the upper surface 12b of the coil center 12a of the first coil layer 12 with a constant exposed area.

In the step shown in FIG. 26, the upper surface 14a of the raised layer 14 is sagged and rounded by the influence of heat treatment for curing. Therefore, the upper surface 12b of the coil center 12a of the first coil layer 12 formed on the raised layer 14 is also rounded following the shape of the upper surface 14a of the raised layer 14.

When the upper surface 12b of the coil center 12a is formed in a curved surface, not a flat surface, as described above, the exposed area of the upper surface 12b of the coil center 12a, which is exposed from the upper surface of the coil insulating layer 15, varies according to the amount of polishing of the upper surface 12b of the coil center 12a during the step shown in FIG. 27. The amount of polishing is determined by the position where the reference plane A shown in FIG. 24 and the upper surface of the coil insulating layer 15 lie in the same plane.

Therefore, in the step shown in FIG. 27, polishing of the coil insulating layer 15, for example, up to B—B line so that the upper surface 12b and the reference plane A lie in the same plane, and polishing of the coil insulating layer 15, for example, up to C—C line so that the upper surface 12b and the reference plane A lie in the same plane are different in the exposed area of the upper surface 12b of the coil center 12a which is exposed from the upper surface of the coil insulating layer 15. Therefore, in the structure in which the coil center 12a of the first coil layer 12 is formed on the raised layer 14, the area of contact between the coil centers 12a and 16a of the first and second coil layers 12 and 16 readily varies with the product, and thus the DC resistance value varies to fail to keep quality constant.

Furthermore, when the coil insulating layer 15 is polished to the C—C line shown in FIG. 27 to significantly decrease the contact area between the coil centers 12a and 16a of the first and second coil layers 12 and 16, conductivity between the coil centers deteriorates.

Also, in the step of the above-described production method shown in FIG. 27, the height of the coil center 12a varies according to the amount of polishing, and the DC resistance value accordingly varies. Therefore, the thickness of the raised layer 14 must be set to a constant value so that the heights of the coil centers 12a of all products are constant after polishing. However, the thickness of the raised layer 14 readily varies according to the heat treatment conditions for curing to cause a difficulty in setting the thickness of the raised layer 14 to a constant value. Therefore, the height dimension of the coil center 12a formed on the raised layer 14 also varies with change in the thickness of the raised layer 14, and thus the height dimension of the coil center 12a readily varies to cause a difficulty in producing products having a constant DC resistance value.

Furthermore, as shown in FIG. 28, when the aperture pattern 20 is formed at a position deviating from the position directly above the raised layer 14 during exposure and development of the resist layer 19, the shape of the coil center 12a of the first coil layer 12 formed in the aperture pattern 20 varies according to the position where the aperture pattern 20 is formed. Therefore, the exposed area of the upper surface 12b and the height dimension of the coil center 12a of the first coil layer 12 vary with the product, thereby failing to stabilize the DC resistance value.

As described above, the structure for conductively connecting the coil center 16a of the second coil layer 16 to the coil center 12a of the first coil layer 12 formed on the raised layer 14 has the problems of failing to obtain a stable DC resistance value and causing a difficulty in achieving good conductivity.

The above-described problems of variation in the DC resistance value and poor conductivity also readily occur between a bump and a lead layer formed below an external connecting terminal.

SUMMARY OF THE INVENTION

Accordingly, the present invention has been achieved for solving the problems of a conventional technique, and an object of the present invention is to provide a thin film magnetic head comprising a contact portion formed by plating between the coil centers of first and second coil layers so that the DC resistance value can be stabilized, and conductivity can be improved.

Another object of the present invention is to provide a method of manufacturing the thin film magnetic head capable of easily forming the contact portion by plating by a small number of steps, and capable of conductively connecting an electrode lead layer and a bump of, for example, a MR head, during the step of conductively connecting the coil layers, thereby simplifying the manufacturing process.

In order to achieve the objects of the present invention, there is provided a thin film magnetic head comprising a coil layer provided between lower and upper core layers, for inducing a recording magnetic field in each of the core layers, wherein the coil layer comprises a first coil layer and a second coil layer formed on the first coil layer with a coil insulating layer provided therebetween, the coil center of the first coil layer is formed on a planarized surface, a first contact portion is formed by plating on the coil center of the first coil layer to pass through the coil insulating layer, and the coil center of the second coil layer is conductively connected to the upper surface of the first contact portion exposed from the upper surface of the coil insulating layer.

In the present invention, the coil centers of the first and second coil layers are conductively connected by the first contact portion formed by plating.

As described above, in the present invention, the coil center of the first coil layer is formed on the planarized surface, thereby permitting the formation of the upper surface of the coil center as a planarized surface.

In the present invention, the first contact portion can be formed in a shape such as a rectangular or cylindrical shape, which has a horizontal section having a constant area, on the coil center by using a resist.

Although the upper surfaces of both the coil insulating layer and the coil center are polished surfaces, in the present invention, the first contact portion can be formed in a shape which has a horizontal section having a constant area, and thus the exposed area of the upper surface of the coil center exposed from the upper surface of the coil insulating layer by polishing can be kept at a constant value.

Therefore, in the present invention, the stable DC resistance can be obtained, and conductivity between the first contact portion and the coil center of the second coil layer conductively connected to the fist contact portion can be improved, thereby maintaining quality constant.

Also, in the present invention, the coil center of the first coil layer can be formed with a constant height dimension by patterning, and thus the height dimension of the first contact portion can be easily set within a predetermined range by previously considering the polishing position of the upper surface of the first contact portion, to obtain a stable DC resistance value.

Even when the first contact portion is formed at a position slightly deviating from the position directly above the coil center of the first coil layer, the exposed area of the upper surface of the first contact portion can be kept constant as long as the first contact portion is appropriately formed to overlap with the coil center. Therefore, a stable resistance value and good conductivity can be obtained.

In the present invention, a pole portion comprising at least a nonmagnetic gap layer and an upper pole layer formed between the gap layer and the upper core layer is formed between the upper and lower core layers at the surface facing a recording medium. Assuming that the joint surface between the pole portion and the upper core layer is a reference plane, preferably, the first coil layer is located behind the pole portion in the height direction, and the upper surface of the coil layer is lower the reference plane. The upper surface of the coil insulating layer formed on the first coil layer is preferably coplanar with the reference plane.

The above-described structure of the thin film magnetic head can comply with a narrower tack and facilitates the formation of a coil layer having a two-layer structure. The track width Tw is regulated by the width dimension of the upper pole layer of the pole portion in the track width direction.

In the present invention, the upper surface of the first contact portion is preferably formed to be coplanar with the upper surface of the coil insulating layer. This permits appropriate conductive connection between the first contact portion and the coil center of the second coil layer.

In the present invention, preferably, a first coil lead layer is formed at a distance from the first coil layer, a second contact portion is formed by plating on the coil connection end of the first coil lead layer so as to pass through the coil insulating layer, and the coil end of the second coil layer is conductively connected to the second contact portion. In this case, the upper surface of the second contact portion is preferably formed to be coplanar with the upper surface of the coil insulating layer.

In the present invention, the coil connection end of the first coil lead layer and the coil end of the second coil layer are conductively connected by the second contact portion. This permits the achievement of a stable DC resistance value of the coil layer, and good conductivity between the first coil lead layer and the second coil layer.

In the present invention, preferably, the first coil lead layer is formed at a distance from the first coil layer, a second coil lead layer is formed integrally with the coil end of the first coil layer, a third contact portion is formed by plating on the external connection end of the first coil lead layer and/or the external connection end of the second coil lead layer so as to pass through the coil insulating layer, and a bump is formed on the third contact portion directly or through another layer. In this case, the upper surface of the third contact portion is preferably formed to be coplanar with the upper surface of the coil insulating layer.

In the present invention, the external connection end of the first coil lead layer and/or the external connection end of the second coil lead layer is conductively connected to the bump by the third contact portion. This permits the achievement of a stable DC resistance value of the coil layer, and good conductivity between the external connection end of the coil lead layer and the bump.

In the present invention, the thin film magnetic head is a combination-type thin film magnetic head comprising a reproducing magnetoresistive element provided below the lower core layer, in which preferably, an electrode lead layer for supplying a sensing current to the magnetoresistive element is formed at a distance from the first coil layer, a fourth contact portion is formed by plating on the external connection end of the electrode lead layer so as to pass through the coil insulating layer, and a bump is formed on the fourth contact portion directly or through another layer. In this case, the upper surface of the fourth contact portion is preferably formed to be coplanar with the upper surface of the coil insulating layer.

In the present invention, the electrode lead layer for supplying a sensing current to the magnetoresistive element is conductively connected to the bump by the fourth contact portion. This can improve the stability of the DC resistance value of a MR head comprising the magnetoresistive element, and conductivity between the electrode lead layer and the bump.

At least one of the first to fourth contact portions preferably has a constant sectional area taken along the direction parallel to the upper surface of the lower core layer. Therefore, in polishing the upper surface of a contact portions by the CMP technique, the exposed area of the upper surface of a contact portion can be kept constant, and stability of the DC resistance value and good conductivity can be obtained.

In the present invention, at least one of the first to fourth contact portions is preferably formed by plating a conductive material layer and a conductive protecting layer of predetermined thickness, which is deposited on the conductive material layer and have no oxide layer on the surface thereof, or plating the conductive material layer with no oxide layer on the surface thereof.

Furthermore, in the present invention, any one of the first coil layer, the second coil layer, the first coil lead layer, the second coil lead layer and the electrode lead layer is preferably formed by plating a conductive material layer and a conductive protecting layer of predetermined thickness, which is deposited on the conductive material layer and have no oxide layer on the surface thereof, or plating the conductive material layer with no oxide layer on the surface thereof.

In the present invention, the conductive material layer preferably comprises a single layer structure or multilayer structure containing one or two of elements, Cu, Au and Ag, and the conductive protecting layer preferably comprises a single layer structure or multilayer structure containing at least one of elements, Ni, Cr, P, Pd, Pt, B and W.

As described above, the reason for forming the contact portion or the coil layer in a laminated structure by plating the conductive material layer and the conductive protecting layer is that in some cases, the upper surface of the contact portion or the coil layer is oxidized by exposure to the air during the manufacturing process.

When such an oxide layer is formed, adhesion between the contact portion and the coil layer deteriorates to easily cause peeling. Also, the DC resistance value is destabilized to deteriorate properties.

In the present invention, therefore, the conductive protecting layer made of, for example, Ni or the like is provided on the conductive material layer to prevent the formation of the oxide layer on the conductive material layer. The conductive protecting layer is formed by using a material in which the thickness of the surface oxide layer does not exceed the thickness of the conductive protecting layer at room temperature or in a heating atmosphere. In the present invention, the oxide layer formed on the conductive protecting layer is removed by etching before the next manufacturing process.

In the present invention, by providing the conductive protecting layer on the conductive material layer, the volume of the conductive material layer can be maintained at a predetermined value without being removed by ion milling, and thus the DC resistance value can easily be kept constant.

A method of manufacturing a thin film magnetic head of the present invention comprises the steps of (a) forming a pole portion which comprises at least a nonmagnetic gap layer and an upper pole layer on a lower core layer and which has a predetermined length dimension from a surface facing a recording medium in the height direction; (b) forming a coil insulating under layer on the lower core layer so that the coil insulating under layer is behind the pole portion in the height direction, and forming a first coil layer on the coil insulating under layer by plating to a height lower than the upper surface of the pole portion; (c) coating the first coil layer with a resist layer and forming an aperture pattern on the coil center of the first coil layer by exposure and development, for forming a first contact portion; (d) forming the first contact portion by plating in the aperture pattern; (e) removing the resist layer and forming a coil insulating layer on the first coil layer and the first contact portion; (f) planarizing the upper surface of the coil insulating layer so that the upper surface of the coil insulating layer is coplanar with the upper surface of the pole portion to expose the upper surface of the first contact portion from the upper surface of the insulating layer; (g) forming a second coil layer by plating on the coil insulating layer to conductively connect the coil center of the second coil layer to the first contact portion; and (h) forming an upper core layer to extend from the upper pole layer to the insulating layer formed on the second coil layer.

In the present invention, by using the resist layer, the first contact portion can easily be formed by plating on the coil center of the first coil layer. Also, in the present invention, the first contact portion is formed by plating directly on the first coil layer, and thus a plating under layer is not required for forming the first contact layer, thereby permitting the formation of the first contact layer by plating by a small number of production steps.

In the present invention, preferably, a first coil lead layer is formed by plating at a distance from the first coil layer in the step (b); a second contact portion is formed by plating on the coil connection end of the first coil lead layer in the steps (c) to (f); and the coil end of the second coil layer is conductively connected to the upper surface of the second contact portion in the step (g).

In the present invention, the second contact portion can be formed by plating for conductively connecting the first coil lead layer and the second coil layer in the step of forming the first contact portion, thereby realizing facilitation and simplification of the manufacturing process. Also, conductive connection between the first coil lead layer and the second coil layer can be appropriately performed.

In the present invention, preferably, the first coil lead layer is formed at a distance from the first coil layer, and a second coil lead layer is formed by plating integrally with the first coil layer to extend from the coil end of the first coil layer in the step (b); a third contact portion is formed by plating on the external connection end of the first coil lead layer and/or the external connection end of the second coil lead layer in the steps (c) to (f); and a bump is formed on the third contact portion directly or through an other layer after the step (h).

In the present invention, the third contact portion can be formed for conductively connecting the external connection end of the first coil lead layer and/or the external connection end of the second coil lead layer and the bump in the step of forming the first contact portion, thereby realizing facilitation and simplification of the manufacturing process. Also, in the present invention, conductive connection between the external connection end of the first coil lead layer and/or the external connection end of the second coil lead layer and the bump can be appropriately performed.

In the present invention, preferably, a reproducing magnetoresistive element is formed below the lower core layer before the step (a); an electrode lead layer for supplying a sensing current to the magnetoresistive element is formed at a distance from the first coil layer in the step (b); a fourth contact portion is formed by plating on the electrode lead layer in the steps (c) to (f); and a bump is formed on the fourth contact portion directly or through another layer after the step (h).

In the present invention, therefore, the fourth contact portion can be formed for conductively connecting the electrode lead layer for supplying a sensing current to the magnetoresistive element and the bump in the step of forming the first contact portion, thereby realizing facilitation and simplification of the manufacturing process.

In the present invention, preferably, a conductive material layer is formed by plating, and then a conductive protecting layer is formed on the conductive material layer by plating, to a predetermined thickness, a material which produces surface oxidation only by a thickness less than the predetermined thickness at room temperature or in a heating atmosphere, during the formation of any one of the first to fourth contact portions in the step (d); and the oxide layer formed on the surface of the conductive protecting layer is removed to expose the conductive protecting layer from the upper surface of the coil insulating layer, or the conductive protecting layer is completely removed to expose the conductive material layer from the upper surface of the coil insulating layer in the step (f) or between the steps (f) and (g).

Alternatively, in the present invention, the conductive material layer is formed by plating, and then the conductive protecting layer is formed on the conductive material layer by plating, to a predetermined thickness, a material which produces surface oxidation only by a thickness less than the predetermined thickness at room temperature or in a heating atmosphere, during the formation of the first coil layer, the first coil lead layer, the second coil lead layer and the electrode lead layer in the step (b) or during the formation of the second coil layer in the step (g); and the oxide layer formed on the surface of the conductive protecting layer is removed to expose the conductive protecting layer from the upper surface of the coil insulating layer, or the conductive protecting layer is completely removed to expose the conductive material layer from the upper surface of the coil insulating layer before the next step.

In the present invention, the conductive material layer is preferably formed by plating in a single-layer or multilayer structure containing one or two of the elements, Cu, Au, and Ag, and the conductive protecting layer is preferably formed by plating in a single-layer or multilayer structure containing at least one of the elements, Ni, Cr, P, Pd, Pt, B and W.

As described above, in the present invention, the contact portion or the coil layer is formed by plating in a laminated structure comprising the conductive material layer and the conductive protecting layer. The conductive material layer is made of a conductive material with low electric resistance, for example, such as Cu or the like. However, when the contact portion is formed by plating only the conductive material, the conductive material layer readily sags in polishing the surface of the contact portion, for example, by the CMP technique in the step (f) because the conductive material layer is made of a soft metal. As a result, adhesion to the conductive layer (second coil layer) formed on the contact portion deteriorates, or the DC resistance value varies.

Therefore, in the present invention, the conductive protecting layer made of a metal harder than the conductive material layer, for example, Ni or the like is provided so that the conductive protecting layer is polished. Therefore, there is no probability of polishing of the conductive material layer to cause less problem of sagging due to polishing.

Also, the conductive material layer is easily oxidized by exposure to the air, and thus oxidation of the conductive material layer can be prevented by providing the conductive protecting layer on the conductive material layer. The conductive protecting layer is preferably made of a material which produces surface oxidation only by a thickness less than the thickness of the conductive protecting layer at room temperature or in a heating atmosphere. As this material, the above conductive material such as Ni or the like can be used. In the present invention, the oxide layer formed in the conductive protecting layer is removed by etching before the next manufacturing step.

DESCRIPTION OF THE PREFERRED EMBODIMENTS

Figure 1:
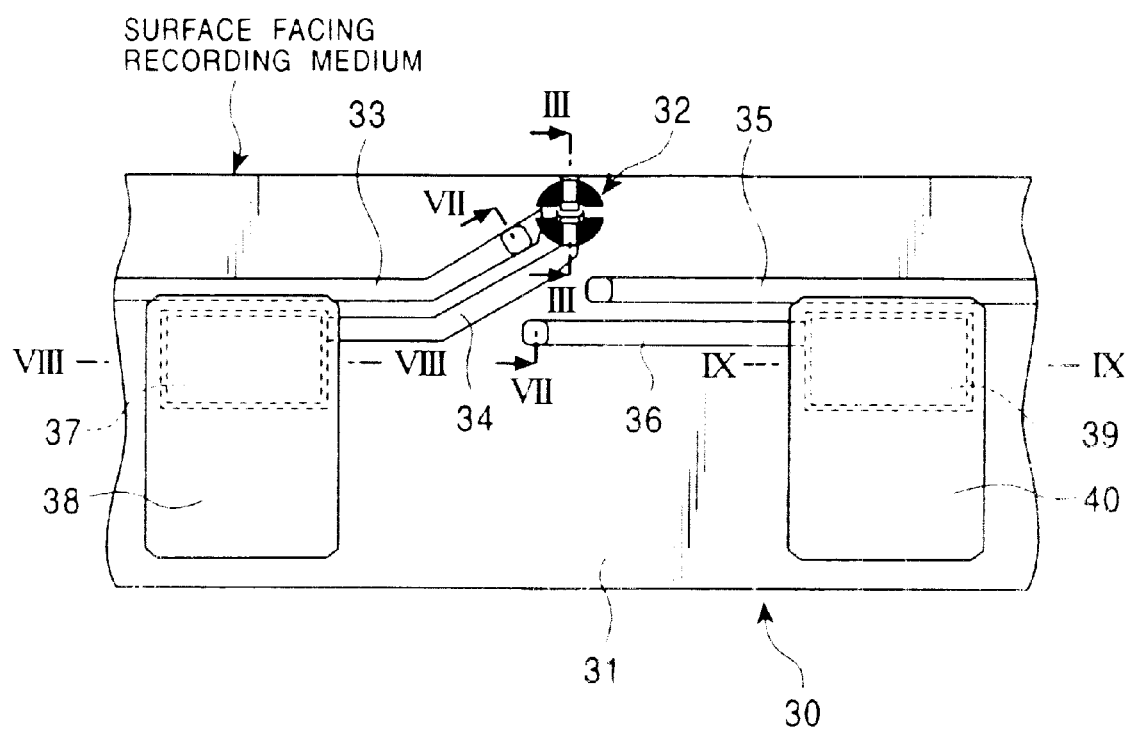
FIG. 1 is a partial front view of the trailing-side end surface of a slider according to an embodiment of the present invention.

FIG. 1 is a partial plan view showing the structure of the trailing-side end surface 31 of a slider 30 according to an embodiment of the present invention. The upper surface of the slider 30 shown in FIG. 1 is the surface facing a recording medium.

The slider 30 shown in FIG. 1 is made of a ceramic material such as alumina-titanium carbide ($Al_2O_3$—TiC) or the like, a thin film magnetic head 32 being laminated on the medium-facing surface side of the trailing-side end surface 31.

The thin film magnetic head 32 is a so-called combination type thin film magnetic head comprising a laminate of a reproducing MR head and a recording inductive head. However, in the present invention, the thin film magnetic head 32 may comprises only the inductive head.

As shown in FIG. 1, four lead layers 33 to 36 are formed by plating on the trailing-side end surface 31 of the slider 30. Of the four lead layers, the first and second lead layers 33 and 34 are coil lead layers conductively connected to coil layers which constitute the inductive head. As shown in FIG. 1, the terminal (external connection end) of the second coil lead layer 34 is conductively connected to an external connection end 38 through a bump 37 formed by plating directly or indirectly on the second coil lead layer 34. Although the structure of the terminal (external connection end) of the first coil lead layer 33 is not shown in the drawing, the terminal is conductively connected to an external connection end through a bump, like the second coil lead layer 34.

The lead layers 35 and 36 shown in FIG. 1 are electrode lead layers for supplying a sensing current to the magnetoresistive element of the MR head, and the terminal (external connection end) of the electrode lead layer 36 is conductively connected to an external connection end 40 through a bump 39 formed by plating directly or indirectly on the electrode lead layer 36. Although the structure of the terminal (external connection end) of the electrode lead layer 35 is not shown in the drawing, the terminal is conductively connected to an external connection end through a bump, like the electrode lead layer 36.

Figure 2:
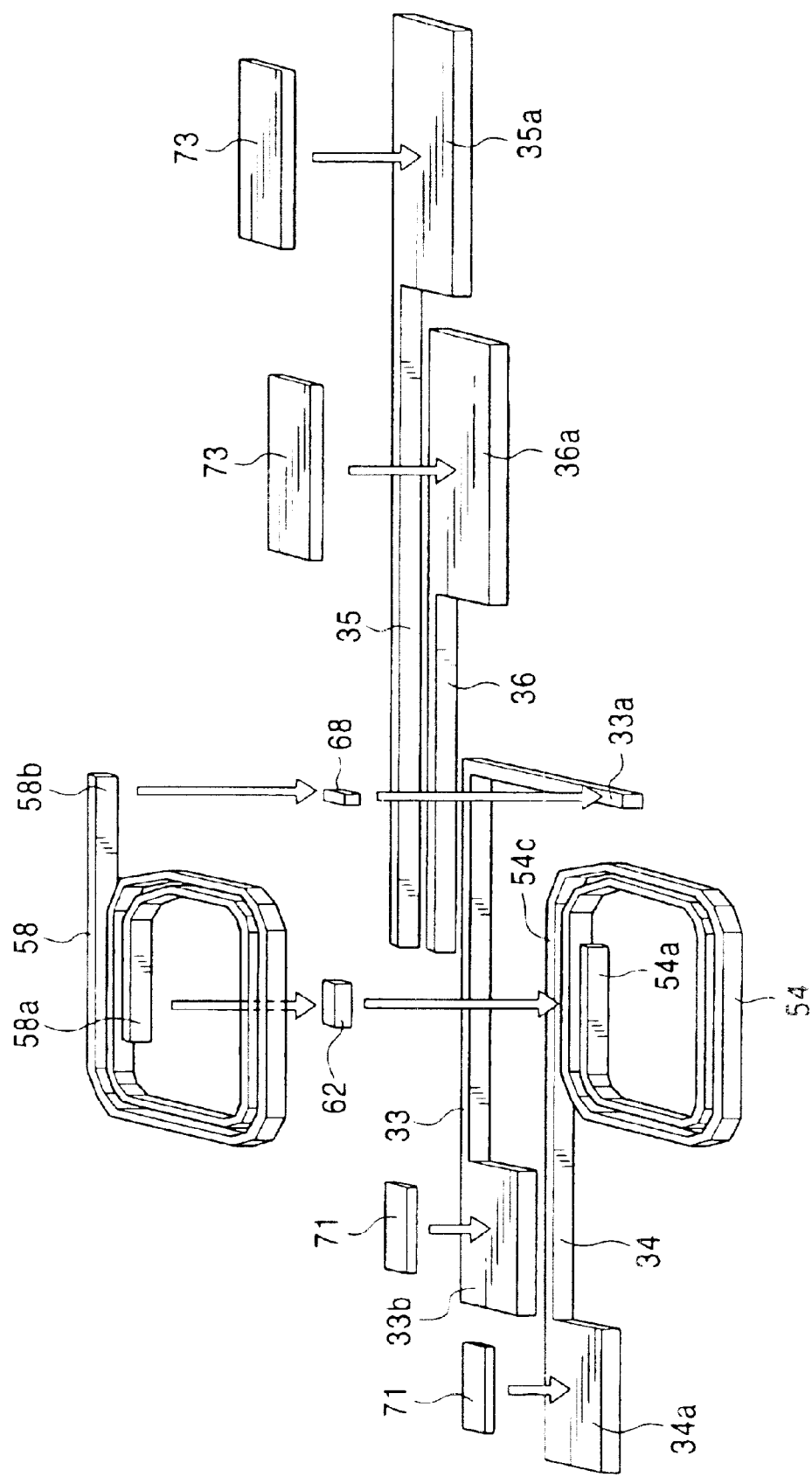
FIG. 2 is a schematic drawing showing a conductive connection structure between two coil layers, and a conductive connection structure between leak layers.
Figure 3:
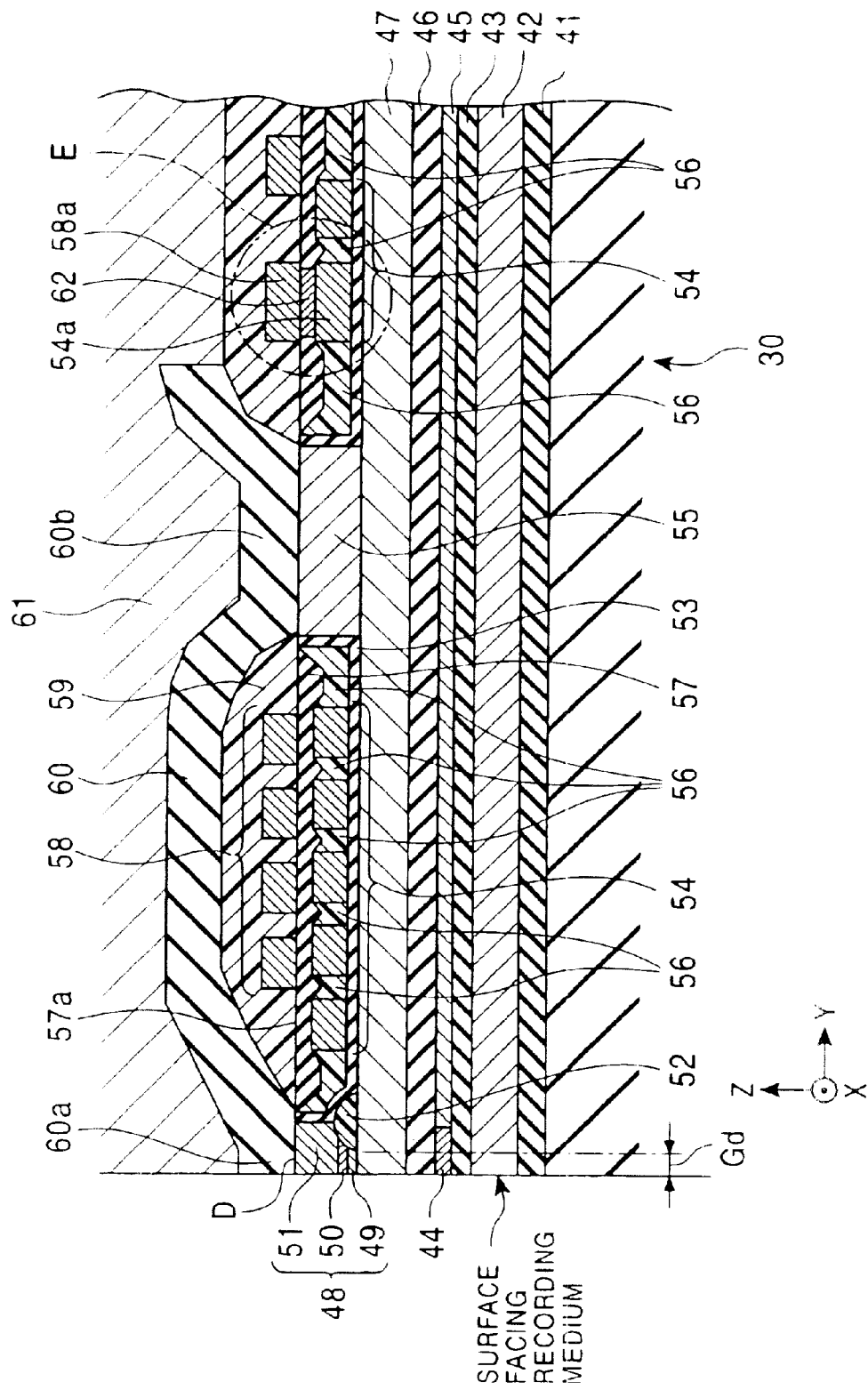
FIG. 3 is a longitudinal partial sectional view of the thin film magnetic head of the present invention taken along line III—III in FIG. 1.

FIG. 2 is a schematic partial drawing showing the conductive connection structure between two coil layers which constitute the inductive head, and the structure of the terminal (external connection end) of each of the lead layers 33 to 36 shown in FIG. 1. FIG. 3 is a longitudinal partial sectional view of the thin film magnetic head 32 shown in FIG. 1 taken along line III—III in FIG. 1.

Each of the layers which constitute the thin film magnetic head 32 of the present invention will be described below. As shown in FIG. 3, an alumina undercoat layer 41 is formed on the slider 30, and a lower shield layer 42 made of a magnetic material such as permalloy (NiFe alloy) is further formed on the undercoat layer 41.

As shown in FIG. 3, a magnetoresistive element 44 is formed on the lower shield layer 42 through a lower gap layer 43 of alumina or the like so as to be exposed at the surface facing the recording medium. The magnetoresistive element 44 is a GMR element or an AMR element represented by a spin valve film, in which a magnetic signal recorded on the recording medium is reproduced by using a change in the electric resistance value due to the influence of an external magnetic field on the magnetoresistive element 44.

Furthermore, an electrode layer 45 is connected to both sides of the magnetoresistive element 44 in the track width direction (the X direction shown in the drawing) so as to extend backward in the height direction (the Y direction shown in the drawing).

As shown in FIG. 3, an upper shield layer (lower core layer) 47 is formed on the electrode layer 45 and the magnetoresistive element 44 through an upper shield layer 46 made of alumina or the like. The upper shield layer 47 is made of a magnetic material, for example, permalloy (NiFe alloy) or the like. The reproducing MR head ranges from the lower shield layer 42 to the upper shield layer (lower core layer) 47.

In this embodiment, the upper shield layer 47 also functions as the lower core layer of the inductive head. The upper shield layer and the lower core layer may be formed separately. In this case, an insulating layer is interposed between the upper shield layer and the lower core layer.

As shown in FIG. 3, a pole portion 48 is formed on the lower core layer 47 to have a predetermined length dimension from the surface facing the recording medium in the backward height direction. The width dimension of the pole portion 48 in the track width direction (the X direction) corresponds to the track width Tw. The track width Tw is, for example, 0.5 μm or less.

In the embodiment shown in FIG. 1, the pole portion 48 has a three-layer structure comprising a lower pole layer 49, a gap layer 50 and an upper pole layer 51. The pole layers 49 and 51 and the gap layer 50 will be described below.

As shown in FIG. 3, the lower pole layer 49 is formed as the lowermost layer of the pole portion 48 on the lower core layer 47 by plating. The lower pole layer 49 is magnetically connected to the lower core layer 47, and may be made of a material different from or the same as the lower core layer 47. Also, the lower pole layer 49 may comprise a single layer film or a multilayer film.

As shown in FIG. 3, the nonmagnetic gap layer 50 is laminated on the lower pole layer 49.

In the present invention, the gap layer 50 is preferably made of a nonmagnetic metal material and formed by plating on the lower pole layer 49. In the present invention, as the nonmagnetic metal material, at least one material is preferably selected from NiP, NiPd, NiW, NiMo, NiRh, Au, Pt, Rh, Pd, Ru, and Cr. The gap layer 50 may comprise a single layer film or a multilayer film.

Next, the upper pole layer 51 is formed by plating on the gap layer 50 to be magnetically connected to an upper core layer 60 which will be described below. The upper pole layer 51 may be made of a material different from or the same as the upper core layer 60. Also, the upper pole layer 51 may comprise a single layer film or a multilayer film.

As described above, when the gap layer 50 is made of a nonmagnetic metal material, the lower pole layer 49, the gap layer 50 and the upper pole layer 51 can be continuously formed by plating.

In the present invention, the pole portion 48 may comprise at least the nonmagnetic gap layer 50 and the upper pole layer 51.

As shown in FIG. 3, a Gd-determining insulating layer 52 is formed on the lower core layer 47 at a distance from the surface facing the recording medium in the height direction. The Gd-determining insulating layer 52 is made of, for example, a resist material. The gap depth (Gd) is regulated by the distance between the tip of the Gd-determining insulating layer 52 and the surface facing the recording medium.

In the embodiment shown in FIG. 3, the pole portion 48 is formed by plating between the lower core layer 47 and the upper core layer 60 to be exposed with the track width Tw at the surface facing the recording medium, thereby making the thin film magnetic head adaptable to a narrower track.

Next, as shown in FIG. 3, a coil insulating under layer 53 is formed on the portion of the lower core layer 47 which is behind the pole portion 48 in the height direction. The coil insulating under layer 53 is preferably made of at least one insulating material selected from AlO, $Al_2O_3$, $SiO_2$, $Ti_2O_5$, TiO, AlN, AlSiN, TiN, SiN, $Si_3N_4$, NiO, WO, $WO_3$, BN, CrN, SiON.

As shown in FIG. 3, a first coil layer 54 made of a conductive material having a low electric resistance, such as Cu or the like, is formed on the coil insulating under layer 53 by plating.

As shown in FIG. 3, the first coil layer 54 is spirally patterned with a coil center 54a as a center so that the coil center 54a is located behind a back gap layer 55, which is magnetically connected to the lower core layer 47, in the height direction (the Y direction).

As shown in FIG. 3, assuming that the joint surface between the upper pole layer 51 and the upper core layer 60 is reference plane D, the upper surface of the first coil layer 54 is formed at a position lower than the reference plane D.

The first coil layer 54 can be formed on the planarized coil insulating under layer 53, and thus the conductor of the first coil layer 54 can be formed at a narrow pitch.

In this embodiment, the pitch intervals of the conductor of the first coil layer 54 are filled with an insulating layer 56 made of an organic insulating material such as a resist material or the like. The reason for using the insulating layer 56 made of an organic insulating material is that the pitch intervals of the conductor of the first coil layer 54 can be securely filled.

Furthermore, as shown in FIG. 3, the first coil layer 54 is coated with a coil insulating layer 57 made of, for example, an inorganic insulating material. As the inorganic insulating material, at least one is preferably selected from $Al_2O_3$, SiN, and $SiO_2$.

As shown in FIG. 3, the upper surface 57a of the coil insulating layer 57 is planarized to be coplanar with the reference plane D.

Furthermore, as shown in FIG. 3, a second coil layer 58 is formed in a spiral pattern by plating on the upper surface 57a of the coil insulating layer 57. Like the first coil layer 54, the second coil layer 59 is also made of a conductive material having low electric resistance, such as Cu or the like. As seen from FIG. 2, the coiling direction of the second coil layer 57 is opposite to the first coil layer 54.

As described above, the upper surface 57a of the coil insulating layer 57, on which the second coil layer 58 is formed, is a planarized surface, and thus the second coil layer 58 can be formed with high pattern precision. Therefore, the conductor of the second coil layer 58 can be formed at a narrow pitch.

The second coil layer 58 is coated with an insulating layer 59 made of an organic insulating material such as a resist material or the like. Furthermore, the upper core layer 60 is patterned on the insulating layer 59, for example, by a frame plating method. As shown in FIG. 3, the tip end 60a of the upper core layer 60 is magnetically connected to the upper pole layer 51, and the base end 60b of the upper core layer 60 is magnetically connected to the back gap layer 55.

The upper core layer 60 is further coated with a protecting layer 61 made of alumina or the like.

Description will now be made of the conductive connection structure between the coil centers 54a and 58a of the first and second coil layers 54 and 58.

In the present invention, as shown in FIGS. 2 and 3, the coil centers 54a and 58a of the first and second coil layers 54 and 58 are conductively connected through a first contact portion 62.

Figure 4:
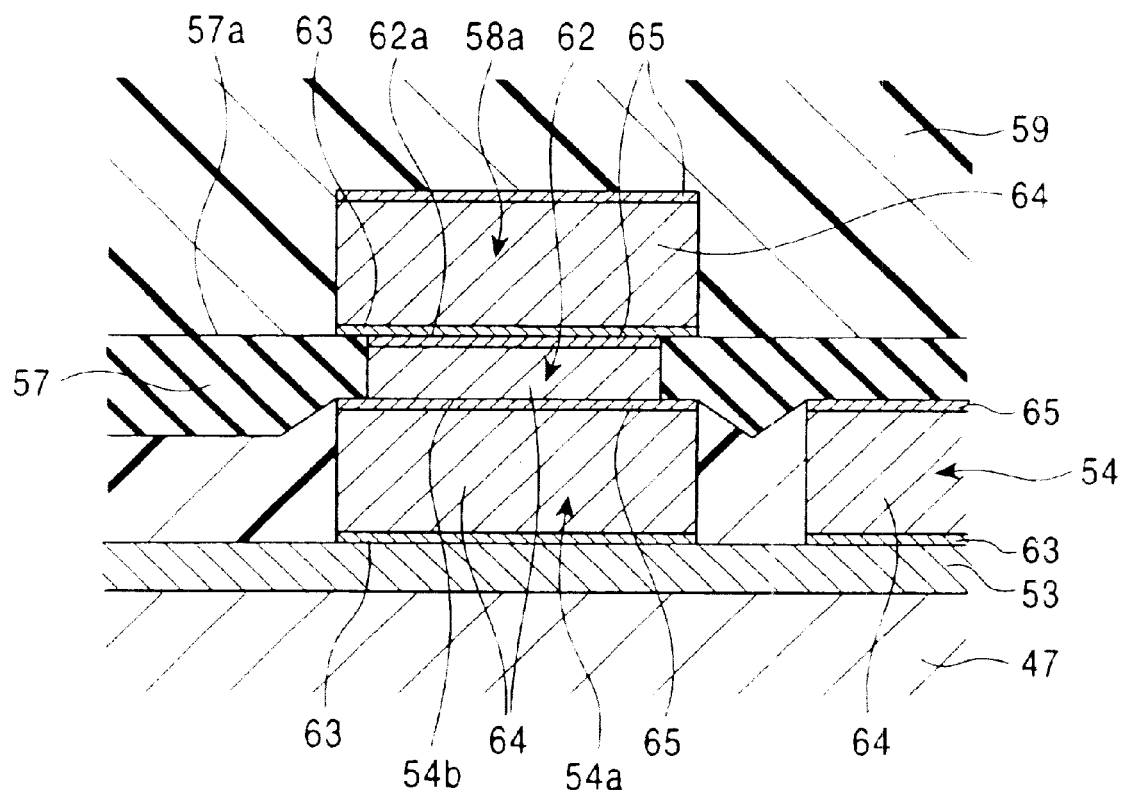
FIG. 4 is an enlarged partial sectional view showing the conductive connection structure between coil layers in portion E shown in FIG. 3.

FIG. 4 is an enlarged partial drawing of the conductive connection structure between the coil layers in the region E shown in FIG. 3. As shown in FIG. 4, the coil center 54a of the first coil layer 54 is formed on the planarized coil insulating under layer 53. Therefore, the upper surface 54b of the coil center 54a can also be formed in a planarized surface.

As shown in FIG. 4, the first contact portion 62 is formed by plating on the coil center 54a to pass through the coil insulating layer 57.

In the embodiment shown in FIG. 4, the upper surface 62a of the first contact portion 62 is formed to be coplanar with the upper surface 57a of the coil insulating layer 57.

As shown in FIG. 4, the width dimension of the first contact portion 62 is preferably smaller than that of the coil center 54a of the first coil layer 54. Therefore, the first contact portion 62 can be appropriately formed on the coil center 54a of the planarized first coil layer 54.

Also, as shown in FIG. 4, the coil center 58a of the second coil layer 58 is conductively connected to the first contact portion 62.

In the present invention, the first contact portion 62 can be patterned by a production method, which will be described below, using a resist layer. As described above, the upper surface of the coil center 54a is planarized, and thus the first contact portion 62 can be formed in a shape such as a rectangular shape, a cylindrical shape, or the like, which has a horizontal section (a section parallel to the upper surface of the lower core layer) with a constant area.

As described in the manufacturing method below, both the upper surfaces 62a and 57a of the first contact portion 62 and the coil insulating layer 57 are polished surfaces. However, in the present invention, the first contact portion 62 can be formed in a shape having a horizontal section with a constant area, and thus the exposed area of the upper surface 62a of the first contact portion 62, which is exposed from the upper surface 57a of the coil insulating layer 57, can be made substantially constant during polishing of the first contact portion 62. Therefore, the contact area between the coil center 58a of the second coil layer 58 and the first contact portion 62 can be made constant, thereby obtaining the stable DC resistance value and maintaining good conductivity with the coil center 58a of the second coil layer 58.

In the present invention, the coil center 54a of the first coil layer 54 can be formed with a predetermined height dimension, and thus the height dimension of the first contact portion 62 formed on the coil center 54a can be set to a predetermined value by considering the polishing position of the first contact portion 62, thereby permitting an attempt to stabilize the DC resistance value.

As described above, the width dimension of the first contact portion 62 is smaller than that of the coil center 54a of the first coil layer 54. Therefore, even when the first contact portion 62 is formed at a position slightly deviating from the position directly above the coil center 54a, the stable DC resistance value can be obtained as long as the first contact portion 62 is superposed on the coil center 54a.

In the embodiment shown in FIG. 4, the upper surface 62a of the first contact portion 62 is formed to be coplanar with the upper surface 57a of the coil insulating layer 57, thereby appropriately achieving conductivity between the first contact portion 62 and the coil center 58a of the second coil layer 58.

Also, in the embodiment shown in FIG. 4, each of the first coil layer 54, the second coil layer 58 and the first contact portion 62 has a laminated structure comprising a conductive material layer and a conductive protecting layer formed by plating to a predetermined thickness, not a single layer of a conductive material having low electric resistance such as Cu or the like.

As shown in FIG. 4, a plating under layer 63 made of a conductive material such as Cu or the like is formed between the first coil layer 54 and the coil insulating under layer 53. Furthermore, a conductive material layer 64 which constitutes the first coil layer 54 is formed by plating on the plating under layer 63.

In the present invention, the conductive material layer 64 preferably comprises a single-layer structure or multilayer structure containing one or two of the elements, Cu, Au and Ag.

As shown in FIG. 4, a conductive protecting layer 65 is formed by plating on the conductive material layer 64. The conductive protecting layer 65 preferably comprises a single-layer structure or multilayer structure containing at least one element of Ni, Cr, P, Pd, Pt, B and W.

The conductive protecting layer 65 has the function to prevent the conductive material layer 64 from being oxidized by exposure to the air.

It is known that when the conductive protecting layer 65 is made of Ni, oxidation of the surface of the conductive protecting layer 65 proceeds only by a thickness of less than 3.0 nm at room temperature or in a heating atmosphere. Therefore, the conductive protecting layer 65 is cut off by 3.0 nm or more by a dry etching method such as ion milling to securely remove the oxide layer from the conductive protecting layer 65. The conductive protecting layer 65 shown in FIG. 4 assumes a state in which the oxide layer is removed from the surface of the conductive protecting layer 65.

In this embodiment, the thickness of the conductive protecting layer 65 is set to 200 to 600 nm. As described above, oxidation of the surface of the conductive protecting layer 65 made of Ni proceeds only by a thickness of less than 3.0 nm, and thus the pickling or ion milling method for removing the oxide layer of the conductive protecting layer 65 can cut off only the conductive protecting layer 65 without cutting the conductive material layer 64. Namely, a volume change of the conductive material layer 64 can be prevented. The conductive material layer 64 is a factor which determines the allowable current and the DC resistance value of the coil layer, and thus the inductive head having constant allowable current and DC resistance value can be formed by preventing a voltage change of the conductive material layer 64. Therefore, the quality of the inductive head can be maintained constant.

By laminating the conductive protecting layer 65 of Ni on the conductive material layer 64 made of Cu, adhesion between the first coil layer 54 and the coil insulating layer 57, and adhesion between the coil center 54a of the first coil layer 54 and the first contact portion 62 can be improved to permit an attempt to stabilize the DC resistance value of the inductive head.

In the present invention, after the oxide layer is formed on the conductive protecting layer 65 by exposure to the air, the conductive protecting layer 65 may be completely removed to form the first coil layer 54 comprising only the conductive material layer 64. In this case, no oxide layer is present on the conductive material layer 64 to appropriately improve adhesion to the first contact portion 62 and stabilize the DC resistance value.

The first contact portion 62 is also formed in a laminated structure comprising the conductive material layer 64 and the conductive protecting layer 65 having no oxide layer and formed to a predetermined thickness on the surface of the conductive material layer 64. The material and the thickness are the same as described above. The first contact portion 62 may be formed by plating only the conductive material layer 64 having no oxide layer on the surface thereof.

Since the first contact portion 62 is formed on the surface of the first coil layer 54 by plating, the plating under layer 63 is not required.

As shown in FIG. 4, the coil center 58a of the second coil layer 58 formed by plating on the first contact portion 62 is also formed by laminating in turn the plating under layer 63, the conductive material layer 64 and the conductive protecting layer 65 having no oxide layer on the surface thereof and a predetermined thickness. The second coil layer 58 may be formed by plating only the conductive material layer 64 on the plating under layer 63 with no oxide layer formed on the surface of the conductive material layer 64.

In forming the coil center 58a of the second coil layer 58 by plating, the plating under layer 63 is first formed because the width dimension of the coil center 58a is larger than the width dimension of the first contact portion 62, as shown in FIG. 4. Without the plating under layer 63, the conductive material layer 64 is easily grown by plating only on the first contact portion 62, to cause a difficulty in forming the coil center 58a of such a rectangular shape as shown in FIG. 4. When the width dimension of the coil center 58a of the second coil layer 58 equals to or smaller than the width dimension of the first contact portion 62, the plating under layer 63 need not be formed for forming the coil center 58a.

Figure 5:
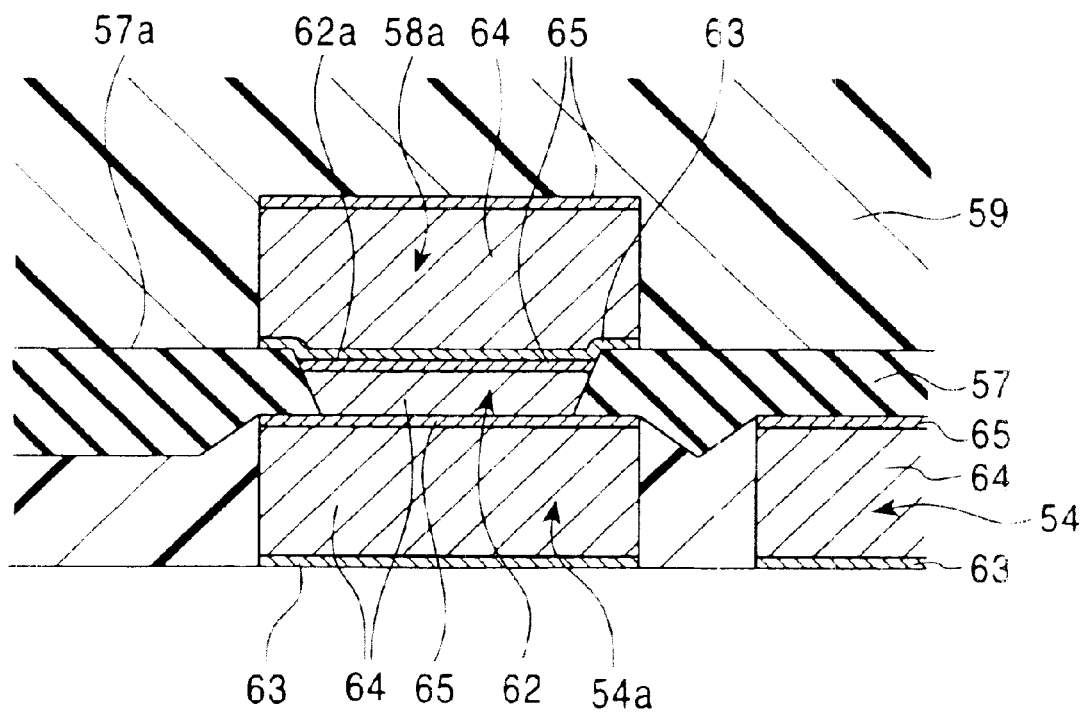
FIG. 5 is an enlarged partial sectional view showing a conductive connection structure between coil layers in accordance with another embodiment of the present invention.

FIG. 5 is an enlarged partial sectional view showing a conductive connection structure between coil center 54a and 58a of first and second coil layers 54 and 58 in accordance with another embodiment of the present invention.

Like in the embodiment show in FIG. 4, in the embodiment shown in FIG. 5, each of the first and second coil layers 54 and 58 is formed in a three-layer plated structure comprising the plating under layer 63, the conductive material layer 64 and the conductive protecting layer 65 having no oxide layer on the surface thereof. The first contact portion is formed in a two-layer plated structure comprising the conductive material layer 64 and the conductive protecting layer 65 having no oxide layer on the surface thereof and a predetermined thickness.

The embodiment shown in FIG. 5 is different from the embodiment shown in FIG. 4 in that the upper surface 62a of the first contact portion 62 is lower than the upper surface 57a of the coil insulating layer 57, not coplanar with the upper surface 57a of the coil insulating layer 57. The upper surface 62a of the first contact portion 62 may be formed to be coplanar with the upper surface 57a of the coil insulating layer 57.

Also, the first contact portion 62 is formed so that the width dimension gradually increases from the lower surface to the upper surface 62a.

In this way, the first contact portions shown in FIGS. 4 and 5 are different in shape due to the manufacturing method described below.

In the embodiment shown in FIG. 5, a trench is first formed in the coil insulating layer 57, for forming the first contact layer 62, and then the first contact portion 62 is grown by plating in the trench. Therefore, the first contact portion 62 is not polished by using the CMP technique.

Therefore, the height dimension of the first contact portion 62 can be controlled by appropriately controlled the plating time, and the exposed area of the planarized upper surface 62a of the first contact portion 62 can easily be kept constant.

In the embodiment shown in FIG. 5, in forming the trench in the coil insulating layer 57, the shape of a resist formed on the coil insulating layer 57 and the irradiation angle of ion milling are appropriately controlled so that the inclined surfaces formed on both sides of the first contact portion 62 can be formed to be close to vertical surfaces. Therefore, the inclined surfaces are not extremely inclined, and thus the exposed area of the upper surface 62a of the first contact portion 62 can easily be maintained in a predetermined range.

In the embodiment shown in FIG. 5, it is possible to readily stabilize the DC resistance value of the coil layer, and improve conductive connection to the coil center 58a of the second coil layer 58.

The conductive connection structures between the coil centers 54a and 58a of the first and second coil layers 54 and 58 shown in FIGS. 4 and 5 can be used for a thin film magnetic head of an embodiment other than the embodiment shown in FIG. 3.

Figure 6:
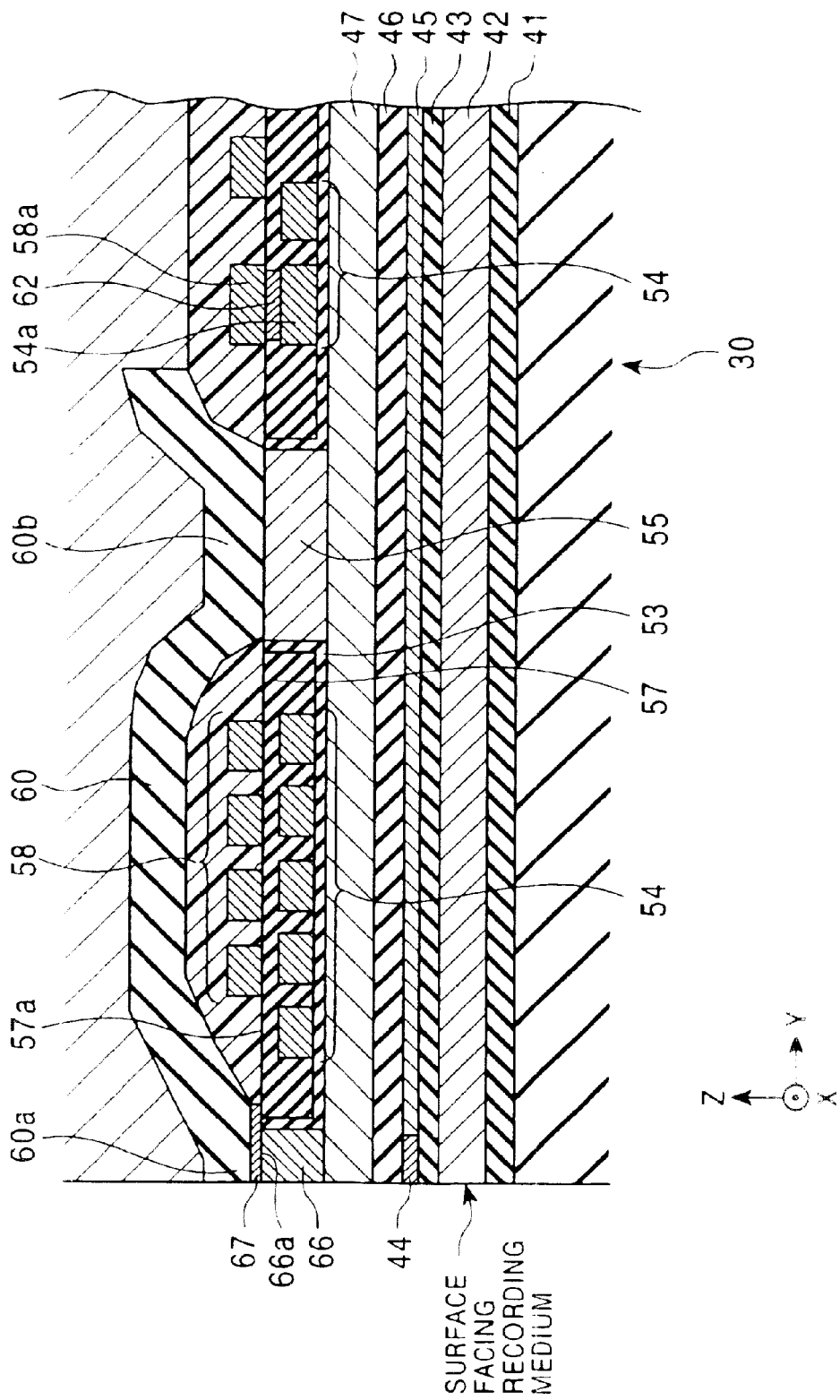
FIG. 6 is a longitudinal partial sectional view of a thin film magnetic head according to a further embodiment of the present invention.

For example, the conductive connection structures can be used for a thin film magnetic head according to an embodiment of the present invention shown in FIG. 6. FIG. 6 is a longitudinal sectional view of the thin film magnetic head.

Like the thin film magnetic head shown in FIG. 3, the thin film magnetic head shown in FIG. 6 is a so-called combination type thin film magnetic head comprising a laminate of a reproducing MR head and a recording inductive head. The thin film magnetic heads shown in FIGS. 3 and 6 are different in the structure of the pole portion formed between the lower core layer 47 and the upper core layer 60 at the surface facing the recording medium.

As shown in FIG. 6, a lower pole layer 66 made of a magnetic material is formed on the lower core layer 47 at the surface facing the recording medium. As shown in FIG. 6, the upper surface 66a of the lower pole layer 66 is formed to be coplanar with the upper surface 57a of the coil insulating layer 57 formed behind the lower pole layer 66 in the height direction (the Y direction shown in the drawing).

Also, a nonmagnetic gap layer 67 is formed on the lower pole layer 66. The rear end of the gap layer 67 is preferably located nearer to the medium-facing surface than the conductor at the tip side of the first coil layer 54. Therefore, the second coil layer 58 can be formed on the planarized coil insulating layer 57, and thus conductive connection between the coil center 58a of the second coil layer 58 and the first contact portion 62 can be appropriately achieved.

The gap layer 67 may be formed to extend backward in the height direction. In this case, the coil insulating layer 57 and the gap layer 67 are interposed between the first and second coil layers 54 and 58. However, the gap layer 67 must be avoided from being formed on the first contact portion 62 so that the first contact portion 62 is conductively connected to the coil center 58a of the second coil layer 58.

Like in the thin film magnetic head shown in FIG. 3, in the embodiment shown in FIG. 6, the gap layer 67 may be made of a nonmagnetic conductive material such as NiP or the like, but a nonmagnetic nonconductive material such as $Al_2O_3$, $SiO_2$, or the like, which is conventionally used for a gap layer, can also be used.

Although, in the embodiment shown in FIG. 6, the pitch intervals of the conductor layer of the first coil layer 54 are filled with the coil insulating layer 57, the pitch intervals may be filled with the insulating layer 56 made of an organic insulating material such as a resist or the like, like in the embodiment shown in FIG. 3.

As described above, in the present invention, the coil centers 54a of the first coil layer 54 is conductively connected to the coil center 58a of the second coil layer 58 through the first contact portion 62, but the conductive connection structure using the contact portion can also be used for another portion.

Figure 7:
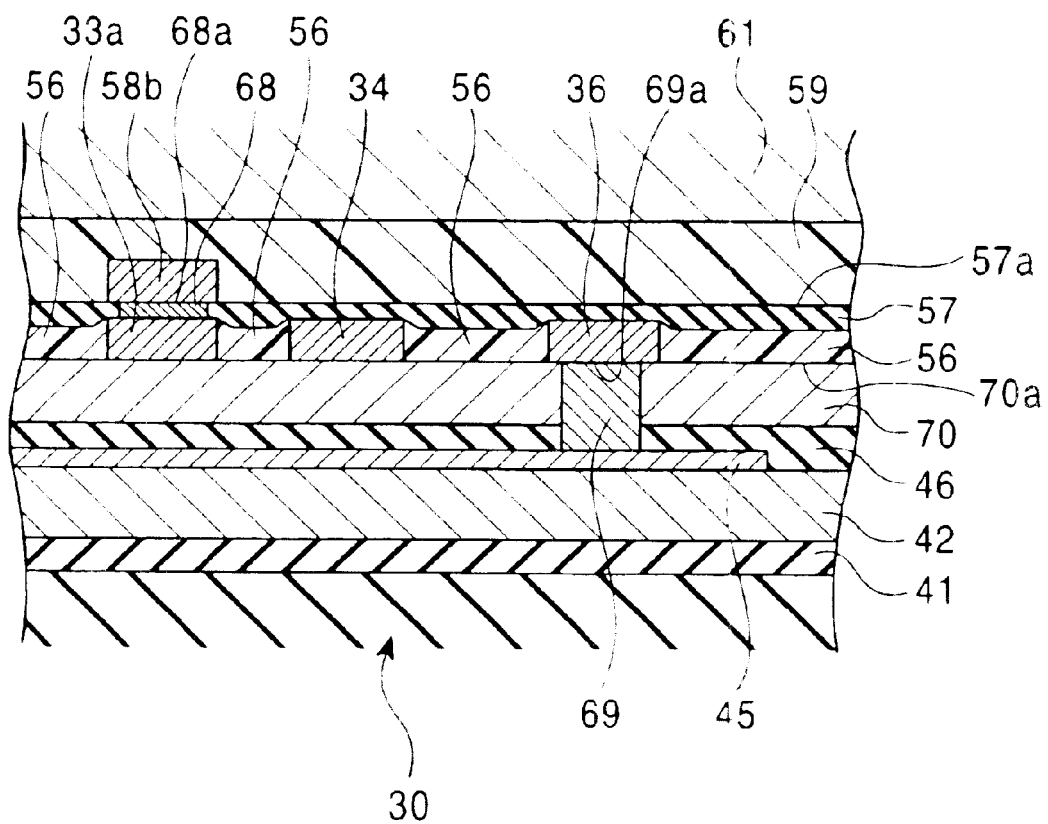
FIG. 7 is a partial sectional view of the thin film magnetic head of the present invention shown in FIG. 1 taken along line VII—VII in FIG. 1.

FIG. 7 is a partial sectional view of the thin film magnetic head shown in FIG. 1 taken along line VII—VII in FIG. 1. First, each of the layers shown in FIG. 7 is described with reference to FIG. 2.

As shown in FIG. 2, the second coil lead layer 34 is formed by plating integrally with the first coil layer 54 to extend from the coil end 54c of the first coil layer 54.

Also, as shown in FIG. 2, the first coil lead layer 33 is formed by plating at a distance from the first coil layer 54. The first coil lead layer 33 is preferably formed by plating on the same plane as the first coil layer 54 in the same step.

As shown in FIG. 2, the coil connection end 33a of the first coil lead layer 33 is formed opposite to the coil end 58b of the second coil layer 58 so that the coil connection end 33a of the first coil lead layer 33 is conductively connected to the coil end 58b of the second coil layer 58 through a second contact portion 68.

As shown in FIG. 2, the two electrode lead layers 35 and 36 are formed by plating at a distance from the first coil layer 54. The lower surfaces of the electrode lead layers 35 and 36 are conductively connected to the electrode layer 45 for supplying a sensing current to the magnetoresistive element 44 of the MR head. The electrode lead layers 35 and 36 are preferably formed by plating on the same plane as the first coil layer 54 in the same step.

The sectional view of FIG. 7 shows the conductive connection structure between the first coil lead layer 33 and the second coil lead layer 58, the second coil lead layer 34, and the conductive connection structure between the electrode lead layer 36 and the electrode layer 45.

As shown in FIG. 7, the coil connection end 33a of the first coil lead layer 33 is formed by plating on an insulating layer 70 formed around the lower core layer 47 shown in FIG. 3.

Besides the first coil lead layer 33, the second coil lead layer 34 and the electrode lead layer 36 are also formed by plating on the insulating layer 70. In FIG. 7, the spaces between these layers are filled with the insulating layer 56 made of an organic insulating material such as a resist or the like. Furthermore, the coil insulating layer 57 made of an inorganic insulating material is formed on the insulating layer 56.

As shown in FIG. 7, the second contact portion 68 is formed by plating on the coil connection end 33a of the first coil lead layer 33 so as to pass through the coil insulating layer 57. The upper surface 68a of the second contact portion 68 is preferably coplanar with the upper surface 57a of the coil insulating layer 57.

As shown in FIG. 7, the coil end 58b of the second coil layer 58 is conductively connected to the second contact portion 68.

This construction can stabilize the DC resistance value of the coil layer, and maintain good conductivity between the second contact portion 68 and the coil end 58b of the second coil layer 58.

Like the first contact portion shown in FIG. 4, the second contact portion 68 preferably has a laminated plated structure comprising the conductive material layer 64 and the conductive protecting layer 65 having no oxide layer on the surface thereof and a predetermined thickness, or only the conductive material layer 64 having no oxide layer on the surface thereof. Like the coil layers shown in FIG. 4, each of the coil lead layers 33 and 34, and the electrode lead layers 35 and 36 is preferably formed in a three-layer plated structure comprising the plating under layer 63, the conductive material layer 64 and the conductive protecting layer 65 having no oxide layer on the surface thereof and a predetermined thickness, or the conductive material layer 64 formed on the plating under layer 63 with no oxide layer formed on the surface of the conductive material layer 64.

As shown in FIG. 7, a contact portion 69 is formed between the second electrode lead layer 36 and the electrode layer 45 so as to pass through the insulating layer 70 formed around the upper gap layer 46 and the lower core layer 47 shown in FIG. 3. The upper surface 69a of the contact portion 69 is preferably formed to be coplanar with the upper surface 70a of the insulating layer 70.

For example, the contact portion 69 formed on the electrode layer 45 is formed by plating a resist layer in the same step as the lower core layer 47. Although the contact portion 69 and the lower core layer 47 are preferably made of the same material because the manufacturing process can be simplified, these layers may be made of different materials. Then, the resist layer is removed, and then the insulating layer 70 is formed around the lower core layer 47. Then, the lower core layer 47 and the upper surface 70a of the insulating layer 70 are polished by, for example, the CMP technique to form the upper surface 70a of the insulating layer 70 and the upper surface 69a of the contact portion 69 in the same plane.

Figure 8:
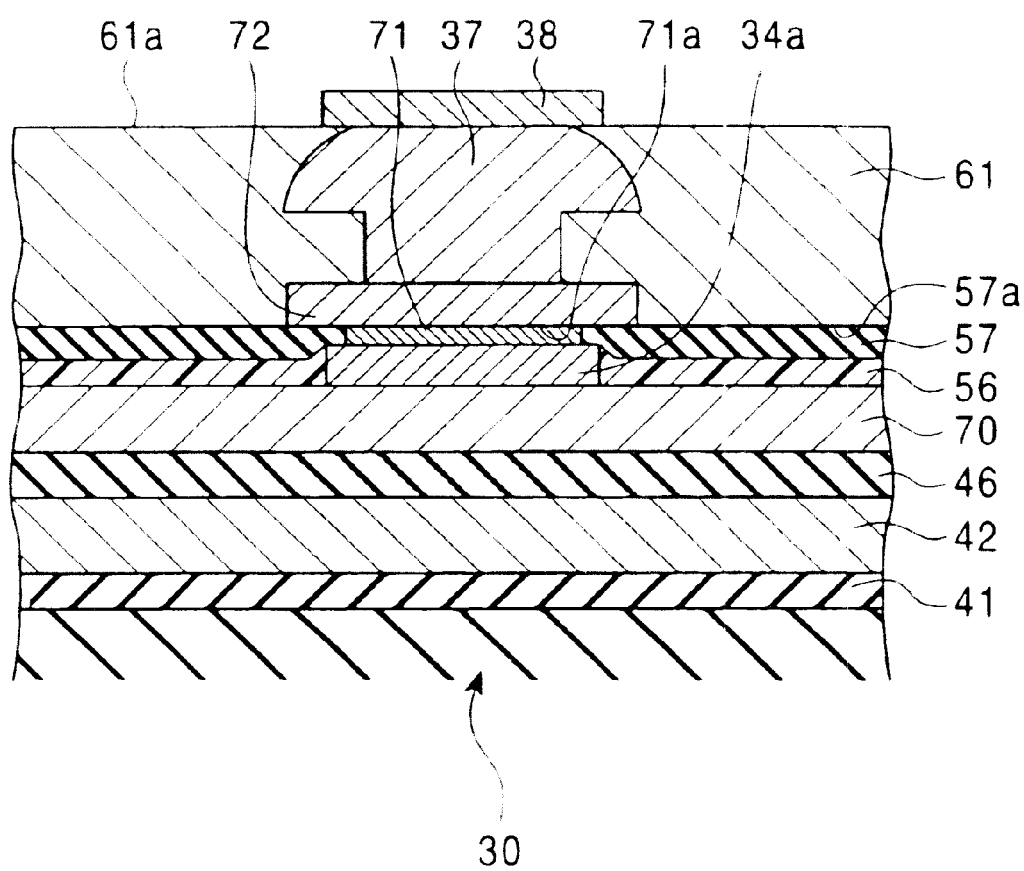
FIG. 8 is a partial sectional view of the thin film magnetic head of the present invention shown in FIG. 1 taken along line VIII—VIII in FIG. 1.

FIG. 8 is a partial sectional view of the thin film magnetic head shown in FIG. 1 taken along line VIII—VIII in FIG. 1.

The portion shown in FIG. 8 is described with reference to FIG. 2. FIG. 8 shows the conductive connection structure formed on the external connection end 34a of the second coil lead layer 34 formed integrally with the first coil layer 54 by plating.

As shown in FIG. 8, the external connection end 34a of the second coil lead layer 34 is formed on the insulating layer 70 formed around the lower core layer 47, and a third contact portion 71 is formed by plating on the external connection end 34a so as to pass through the coil insulating layer 57. The upper surface 71a of the third contact portion 71 is preferably formed to be coplanar with the upper surface 57a of the coil insulating layer 57.

Furthermore, a raised layer 72 is formed on the third contact portion 71 at the same time as the upper core layer 60 shown in FIG. 3. The raised layer 72 and the upper core layer 60 are preferably made of the same material because the manufacturing process can be simplified, but both layers may be made of different materials. Also, the raised layer 72 is not necessarily formed, and without the raised layer 72, a bump 37 described below is conductively connected directly to the third contact portion 71.

The bump 37 is formed by plating on the raised layer 72 so as to pass through the protecting layer 61 formed to cover the thin film magnetic head. The bump 37 is exposed from the upper surface 61a of the protecting layer 61, and conductively connected to an external connection end 38 formed on the protecting layer 61.

Although FIG. 8 shows the conductive connection structure at the external connection end 34a of the second coil lead layer 34, the conductive connection structure at the external connection end 33b of the first coil lead layer 33 shown in FIG. 2 is the same as FIG. 8.

Namely, the third contact portion 71 is formed by plating on the first coil lead layer 33 so as to pass through the coil insulating layer 57, and the raised layer 72, the bump 37 and the external connection end 38 are further formed on the third contact portion 71.

Like the first contact portion 62, the third contact portion 71 preferably has a laminated plated structure comprising the conductive material layer 64 and the conductive protecting layer 65 having no oxide layer on the surface thereof and a predetermined thickness, or only the conductive material layer 64 having no oxide layer on the surface thereof.

The structure shown in FIG. 8 can stabilize the DC resistance value of the coil layer, and maintain good conductivity between the third contact portion 71 and the bump 37.

Figure 9:
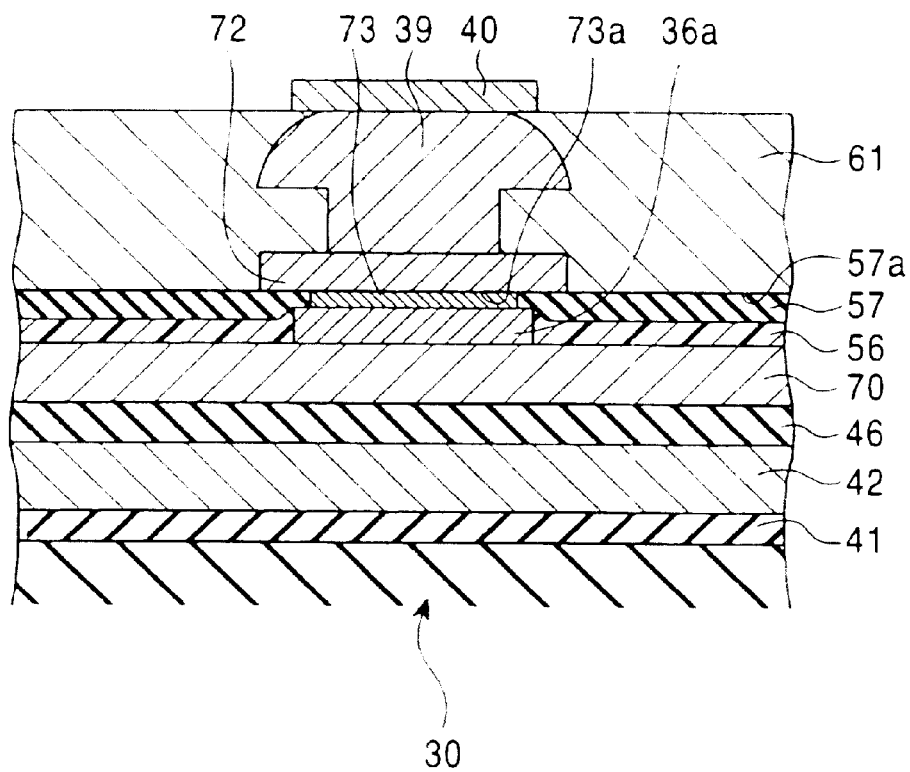
FIG. 9 is a partial sectional view of the thin film magnetic head of the present invention shown in FIG. 1 taken along line IX—IX in FIG. 1.

FIG. 9 is a longitudinal sectional view of the thin film magnetic head shown in FIG. 1 taken along line IX—IX in FIG. 1.

The portion shown in FIG. 9 is the conductive connection structure formed on the external connection end 36a of the electrode lead layer 36 shown in FIG. 2.

As shown in FIG. 9, the external connection end 36a of the electrode lead layer 36 is formed on the insulating layer 70 formed around the lower core layer 47, and a fourth contact portion 73 is formed by plating on the external connection end 36a so as to pass through the coil insulating layer 57. The upper surface 73a of the fourth contact portion 73 is preferably formed to be coplanar with the upper surface 57a of the coil insulating layer 57.

Furthermore, the raised layer 72 is formed on the fourth contact portion 73 at the same time as the upper core layer 60 shown in FIG. 3. The raised layer 72 and the upper core layer 60 are preferably made of the same material because the manufacturing process can be simplified, but both layers may be made of different materials. Also, the raised layer 72 is not necessarily formed, and without the raised layer 72, a bump 39 described below is conductively connected directly to the fourth contact portion 73.

The bump 39 is formed by plating on the raised layer 72 so as to pass through the protecting layer 61 formed to cover the upper core layer 60 shown in FIG. 3. The bump 39 is exposed from the upper surface 61a of the protecting layer 61, and conductively connected to an external connection end 40 formed on the protecting layer 61.

Although FIG. 9 shows the conductive connection structure at the external connection end 36a of the electrode lead layer 36, the conductive connection structure at the external connection end 35a of the electrode lead layer 35 shown in FIG. 2 is the same as FIG. 9.

Namely, the fourth contact portion 73 is formed by plating on the electrode lead layer 35 so as to pass through the coil insulating layer 57, and the raised layer 72, the bump 39 and the external connection end 40 are further formed on the fourth contact portion 73.

Like the first contact portion 62, the fourth contact portion 73 preferably has a laminated plated structure comprising the conductive material layer 64 and the conductive protecting layer 65 having no oxide layer on the surface thereof and a predetermined thickness, or only the conductive material layer 64 having no oxide layer on the surface thereof.

The structure shown in FIG. 9 can stabilize the DC resistance value of the MR head, and maintain good conductivity between the fourth contact portion 73 and the bump 39.

The method of manufacturing the thin film magnetic head shown in FIG. 3 is described below. FIGS. 10 to 20 are longitudinal sectional views of the thin film magnetic head.

Figure 10:
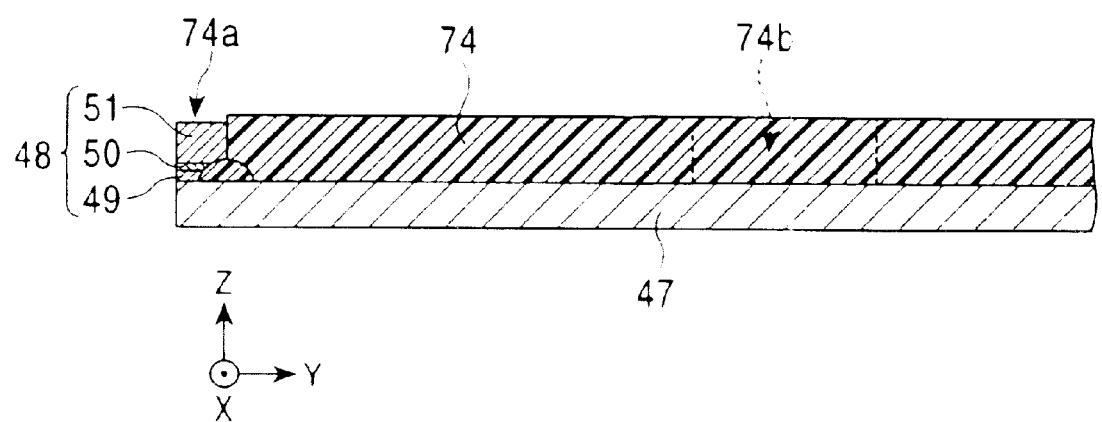
FIG. 10 is a drawing showing a step of a method of manufacturing a thin film magnetic head of the present invention.

As shown in FIG. 10, the Gd-determining layer 52 is formed on the lower core layer 47, and then a resist layer 74 is formed on the lower core layer 47. Then, a pole portion formation trench 74a is formed on the medium-facing surface side of the resist layer 74 by patterning by exposure and development so that the width dimension in the track width direction (the X direction) corresponds to the track width Tw.

Next, the pole portion 48 comprising the lower pole layer 49, the gap layer 50 and the upper pole layer 51 is formed in turn from the bottom in the pole portion formation trench 74a. For the gap layer 50, a nonmagnetic metal material which can be plated is preferably selected. Specifically, at least one material is preferably selected from NiP, NiPd, NiW, NiMo, Au, Pt, Rh, Pd, Ru, and Cr.

Therefore, the lower pole layer 49, the gap layer 50 and the upper pole layer 51 can be continuously formed by plating. In the present invention, the pole portion 48 may be formed in a two-layer structure comprising the gap layer 50 and the upper pole layer 51.

In the present invention, after the resist layer 74 is removed, a new resist layer having an aperture pattern is formed for forming the back gap layer 55, and then the back gap layer 55 is formed.

Alternatively, as shown in FIG. 10, an aperture pattern 74b for forming the back gap layer 55 may be formed on the lower core layer 47 at a distance from the surface facing the recording medium in the height direction (the Y direction) by exposure and development, and then the back gap layer 55 may be formed in the aperture pattern 74b.

Figure 11:
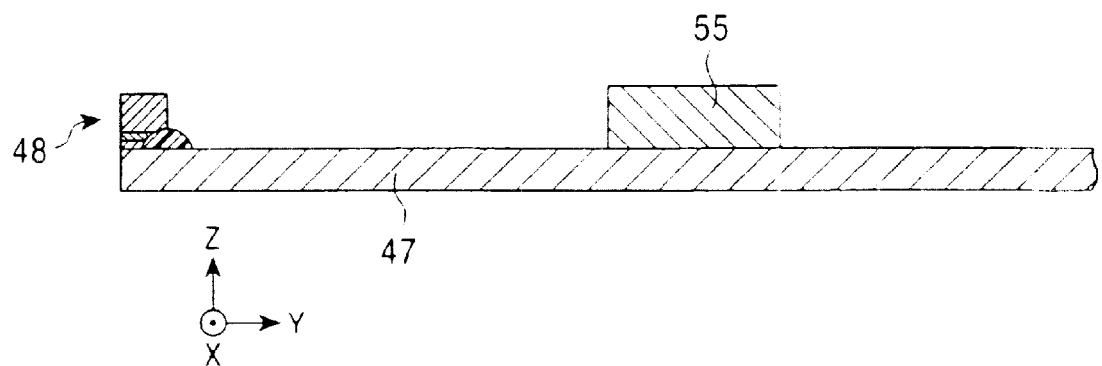
FIG. 11 is a drawing showing the step after the step shown in FIG. 10.

FIG. 11 shows the state in which the pole portion 48 and the back gap layer 55 are formed on the lower core layer 47.

Figure 12:
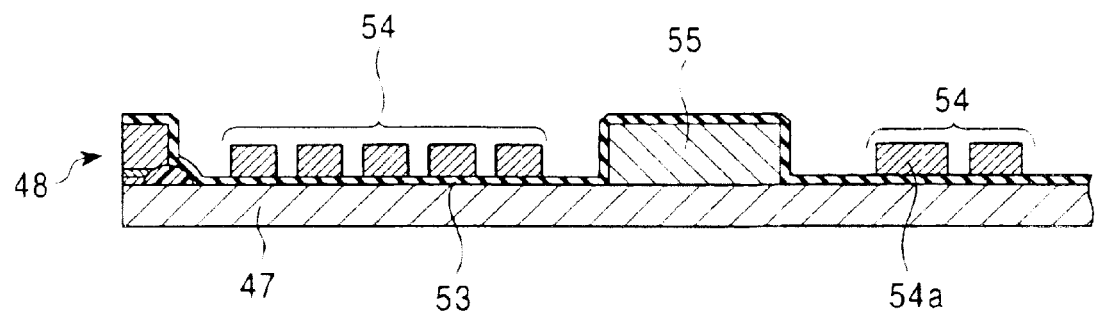
FIG. 12 is a drawing showing the step after the step shown in FIG. 11.

In the next step shown in FIG. 12, the coil insulating under layer 53 is formed on the pole portion 48, the lower core layer 47 and the back gap layer 55.

Furthermore, the first coil layer 54 is patterned on the coil insulating under layer 53. As shown in FIG. 12, the coil center 54a of the first coil layer 54 is located behind the back gap layer 55 in the height direction (the Y direction), and the first coil layer 54 is spirally formed by plating to extend from the coil center 54a.

As shown in FIG. 12, the upper surface of the first coil layer 54 is formed at a position lower than the upper surface 48a of the pole portion 48.

In the present invention, the conductor of the first coil layer 54 and the coil center 54a thereof can be formed on the planarized coil insulating under layer 53. Therefore, the first coil layer 54 can be formed in the predetermined shape with narrow pitch intervals of the conductor.

Next, as shown in FIGS. 13 to 16, the first contact portion 62 is formed by plating on the coil center 54a of the first coil layer 54.

Figure 13:
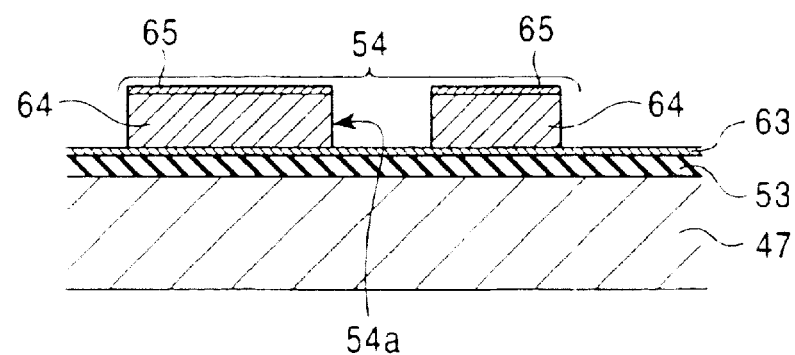
FIG. 13 is a drawing showing the step of forming a first contact portion by plating on the coil center of a first coil layer after the step shown in FIG. 12.

FIG. 13 is a sectional view showing the first coil layer 54 continuously formed by plating the conductive material layer 64 and the conductive protecting layer 65 on the plating under layer 63 formed over the entire surface of the coil insulating layer 53.

In the present invention, the conductive material layer 64 is preferably formed by plating in a single-layer structure or multilayer structure containing one or two of the elements, Cu, Au and Ag, and the conductive protecting layer is preferably formed by plating in a single-layer structure or multilayer structure containing at least one of the elements, Ni, Cr, P, Pd, Pt, B and W.

Even when an oxide layer is formed on the conductive protecting layer, the thickness of the oxide layer is less than the thickness of the conductive protecting layer 65, and thus the oxide layer can be securely removed by ion milling or the like, thereby causing no probability of damage to the conductive material layer 64. In removing the oxide layer by etching, only the portion of the conductive protecting layer 65, in which the oxide layer is formed, is removed, or the entirety of the conductive protecting layer 65 is removed. As a result, the conductive protecting layer 65 without the oxide layer on the surface thereof is left on the upper surface of the first coil layer 54, or the conductive material layer 64 without the oxide layer is exposed. This can stabilize the DC resistance value and improve adhesion.

Figure 14:
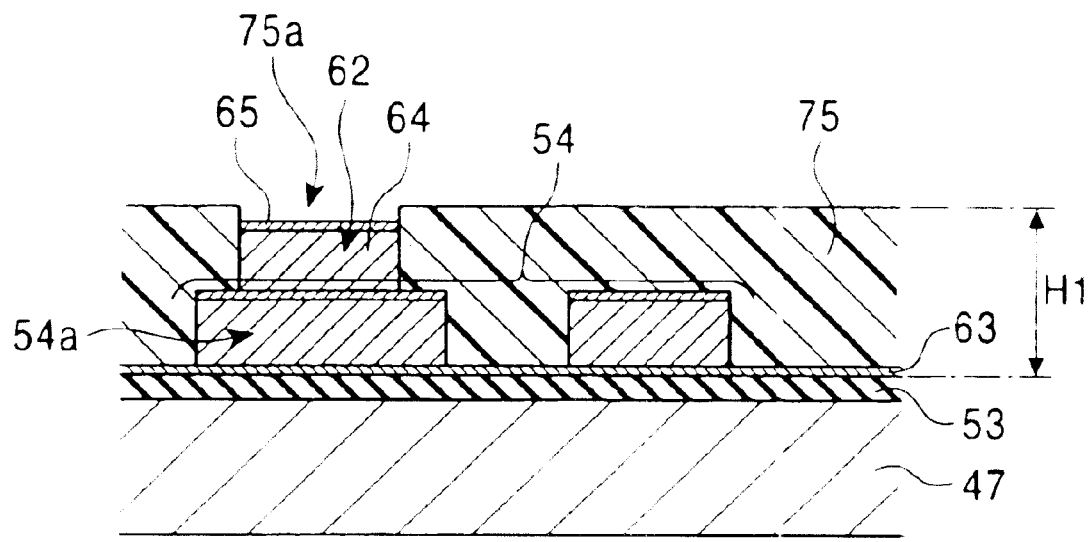
FIG. 14 is a drawing showing the step after the step shown in FIG. 13.
Figure 15:
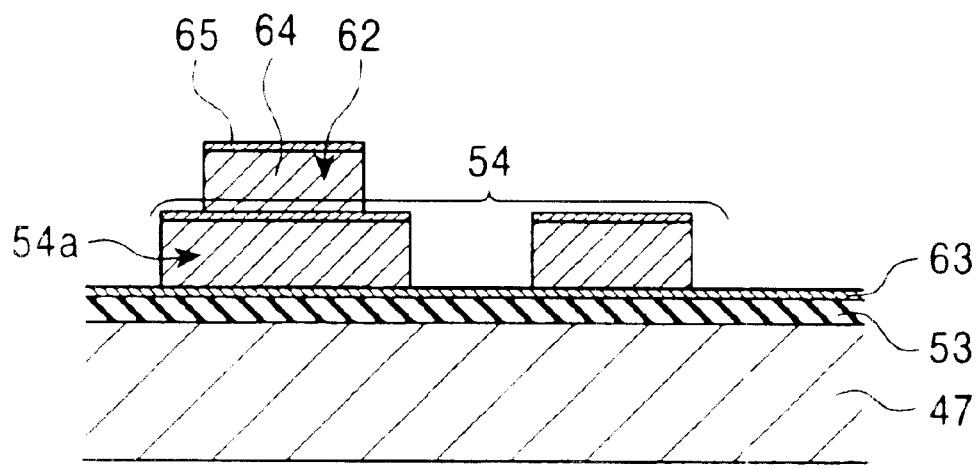
FIG. 15 is a drawing showing the step after the step shown in FIG. 14.

Next, as shown in FIG. 14, the first coil layer 54 is coated with a resist layer 75. Although, as shown in FIG. 14, the resist layer 75 is formed to thickness H1, which is preferably equal to or larger than the height dimension of the pole portion 48 shown in FIG. 12. The reason for this is to facilitate the formation the upper surface of the first contact portion 62 by plating on the coil center 54a of the first coil layer 54 so that the upper surfaces of the first contact portion 62 and the coil insulating layer 57 lie in the same plane.

As shown in FIG. 14, after the resist layer 75 is formed on the first coil layer 54, an aperture pattern 75a is formed, by exposure and development, in the portion of the resist layer 75, which is formed on the coil center 54a of the first coil layer 54.

The aperture pattern 75a formed in the resist layer 75 by exposure and development has a shape such as a rectangular or cylindrical shape, which has a constant sectional area parallel to the upper surface of the lower core layer 47.

Then, the first contact portion 62 is formed by plating in the aperture pattern 75a of the resist layer 75. As described above, the oxide layer formed on the upper surface of the first coil layer 54 has been removed, and thus the first contact portion 62 can be formed by plating on the coil center 54a of the first coil layer 54 with high adhesion.

As shown in FIG. 14, the first contact portion 62 is preferably formed in the laminated structure comprising the conductive material layer 64 and the conductive protecting layer 65. The materials of the conductive material layer 64 and the conductive protecting layer 65 are the same as described above.

In the present invention, in forming the first contact portion 62, the plating under layer 63 need not be formed because the first contact portion 62 is formed by plating directly on the coil center 54a of the first coil layer 54. Therefore, the step of forming the first contact layer 62 can be simplified.

The upper surface of the first contact portion 62 is formed to be substantially coplanar with the upper surface of the resist layer 75, or slightly lower than the upper surface of the resist layer 75, as shown in FIG. 14. Then, the resist layer 75 is removed to obtain the structure shown in FIG. 15.

In the present invention, in the step shown in FIG. 14, the aperture pattern 75a for forming the first contact portion 62 can be formed in a shape such as a rectangular or cylindrical shape, which has a constant sectional area parallel to the upper surface of the lower core layer 47, and thus the first contact portion 62 can also be formed in a shape having a constant sectional area parallel to the upper surface of the lower core layer 47.

Figure 16:
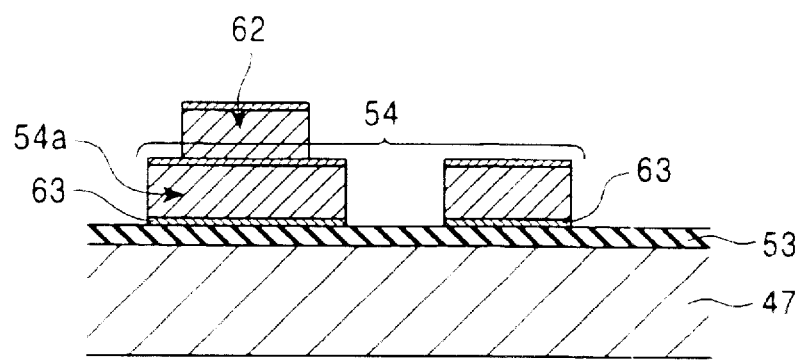
FIG. 16 is a drawing showing the step after the step shown in FIG. 15.

Next, in the step shown in FIG. 16, the plating under layer 63 is removed by etching, except the portion formed below the conductive material layer 64 of the first coil layer 54.

Figure 17:
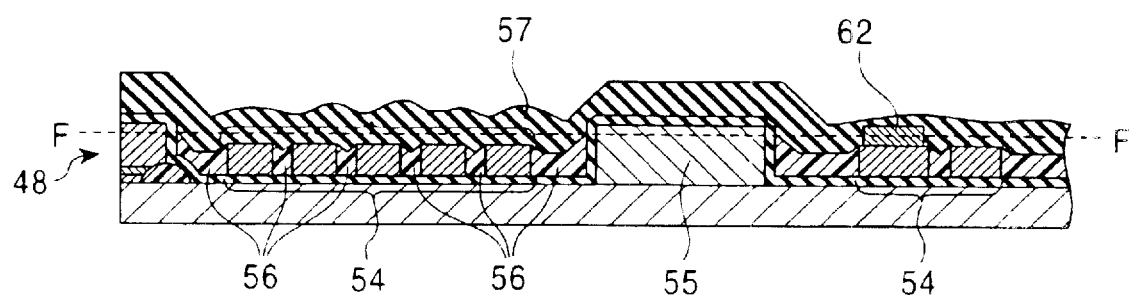
FIG. 17 is a drawing showing the step after the step shown in FIG. 16.
Figure 18:
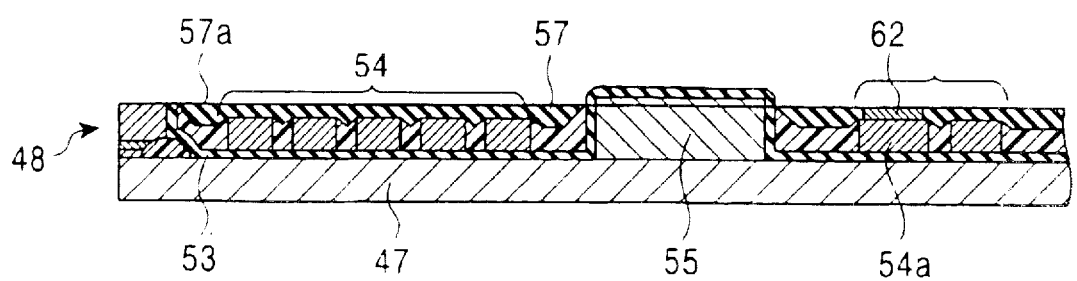
FIG. 18 is a drawing showing the step after the step shown in FIG. 17.

Next, as shown in FIG. 17, the pitch intervals of the conductor of the first coil layer 54 are filled with the insulating layer 56 made of an organic material such as a resist or the like, and then the coil insulating layer 57 is formed on the first coil layer 54 by sputtering. The coil insulating layer 57 is preferably made of an inorganic insulating material. This is because the upper surface of the coil insulating layer 57 is polished by the CMP technique. As the inorganic insulating material, at least one material is preferably selected from $Al_2O_3$, SiN, and $SiO_2$.

As shown in FIG. 17, the coil insulating layer 57 is also formed on the pole portion 48 and the back gap layer 55 by sputtering.

Next, as shown in FIG. 17, the upper surface of the coil insulating layer 57 is polished to line F—F by, for example, the CMP technique. By this polishing, the upper surfaces of the pole portion 48, the back gap layer 55, and the first contact portion 62 formed by plating on the coil center 54a of the first coil layer 54 are exposed in a surface coplanar with the upper surface 57a of the coil insulating layer 57 (refer to FIG. 18).

As described above, in the step shown in FIG. 16, the first contact portion 62 can be formed in a shape such as a rectangular or cylindrical shape, which has a constant sectional area parallel to the upper surface of the lower core layer 47, and thus the exposed area of the upper surface of the first contact portion 62 can be made constant.

By polishing, the oxide layer formed on the conductive protecting layer 65 of the first contact portion 62 is preferably removed to leave a portion of the conductive protecting layer, thereby exposing the conductive protecting layer from the upper surface of the coil insulating layer 57. Alternatively, the conductive protecting layer 65 may be completely removed to expose the upper surface of the conductive material layer with no oxide layer.

When the first contact portion 62 is not provided with the conductive protecting layer 65 made of Ni or the like, the conductive material layer made of a soft metal such as Cu or the like sags during polishing of the upper surface of the conductive material layer 64, thereby easily destabilizing the DC resistance value and causing deterioration in adhesion. Therefore, in the present invention, the conductive protecting layer 65 made of a harder metal than the conductive material layer 64 is provided to form the first contact layer 62 which causes no sagging of the upper surface during polishing of the conductive protecting layer 65.

When the thin film magnetic head is exposed to the air between the polishing step and the step of forming the second coil layer 58 described below, etching is preferably performed for removing the oxide layer newly formed on the conductive protecting layer 65 before the second coil layer 58 is formed.

This can remove the oxide layer on the upper surface of the first contact layer 62 to improve adhesion to the coil center 58a of the second coil layer 58.

Figure 19:
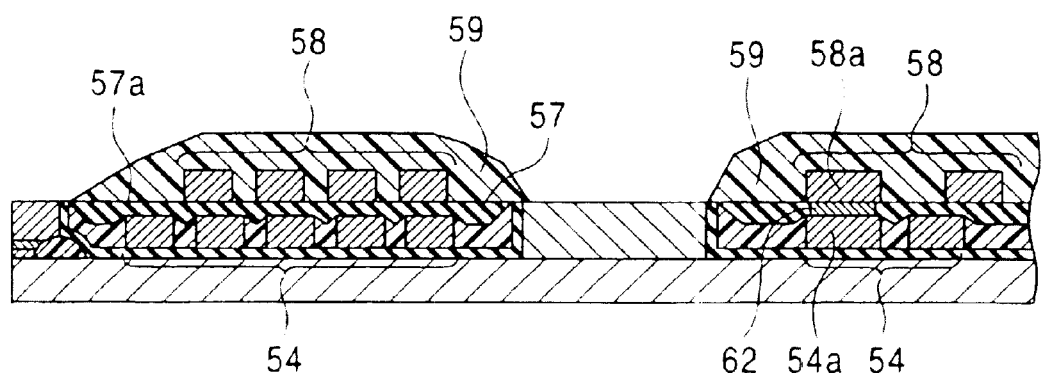
FIG. 19 is a drawing showing the step after the step shown in FIG. 18.

Next, as shown in FIG. 19, the second coil layer 58 is patterned on the upper surface 57a of the coil insulating layer 57. In this step, the coil center 58a of the second coil layer 58 is conductively connected to the fist contact portion 62 exposed from the coil insulating layer 57. The conductor of the second coil layer 58 is spirally formed by plating with the coil center 58a as a center. The second coil layer 58 is preferably formed in a three-layer plated structure comprising the plating under layer 63, the conductive material layer 64 and the conductive protecting layer 65 which are formed from the bottom. After the second coil layer 58 is formed, the oxide layer formed on the conductive protecting layer 65 or the entire conductive protecting layer 65 and the plating under layer 63 except the portion formed below the second coil layer 58 are removed by etching. Furthermore, the insulating layer 59 made of an organic insulating material is coated on the second coil layer 58.

Figure 20:
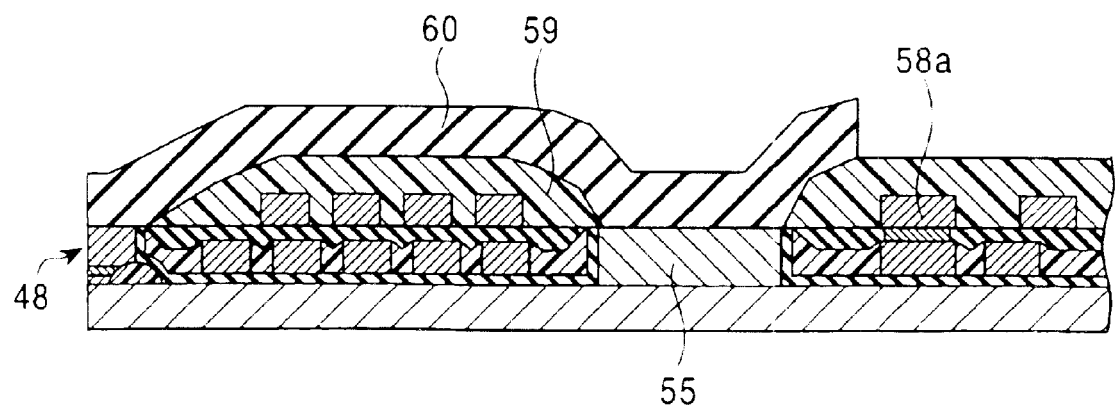
FIG. 20 is a drawing showing the step after the step shown in FIG. 19.

In the step shown in FIG. 20, the upper core layer 60 is patterned by the frame plating method to extend from the pole portion 48 to the back gap layer 55 and the insulating layer 59. As a result, the thin film magnetic head shown in FIG. 3 is completed.

As described above, in the present invention, the first contact portion 62 can easily be formed only by pattering using the resist layer in a small number of steps.

In the present invention, the coil center 54a of the first coil layer 54 can be formed on the planarized coil insulating under layer 53, the upper surface of the coil center 54a can be formed in a planarized surface, and the upper surface of the first contact portion 62 formed on the coil center 54a by plating can also be formed in a planarized surface. Particularly, in the present invention, the first contact portion 62 can be formed in a shape having a constant sectional area parallel to the upper surface of the lower core layer 47. Therefore, it is possible to maintain the area of the upper surface of the first contact portion 62 constant to obtain the stable DC resistance value, and improve conductivity with the coil center 58a of the second coil layer 58.

Figure 21:
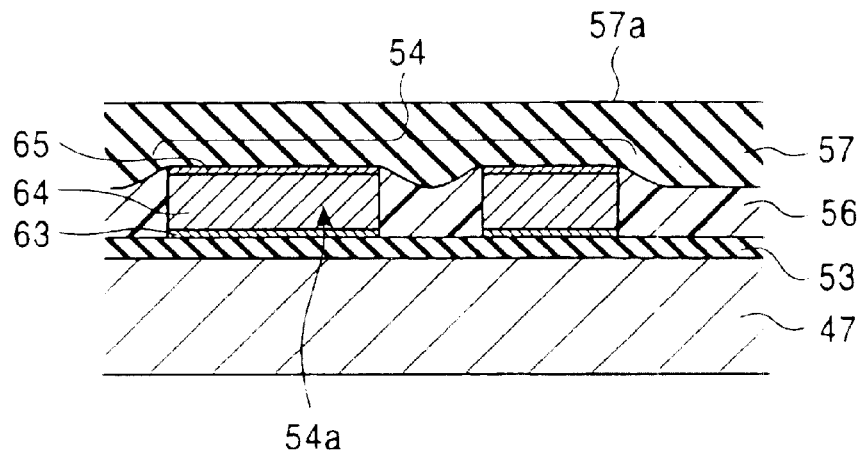
FIG. 21 is a drawing showing the step of forming a first contact portion by plating on the coil center of a first coil layer by another method.
Figure 22:
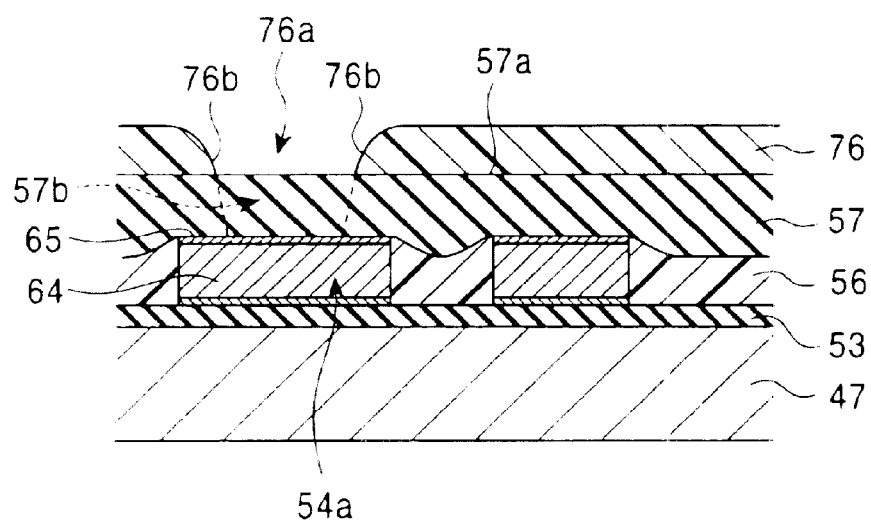
FIG. 22 is a drawing showing the step after the step shown in FIG. 21.
Figure 23:
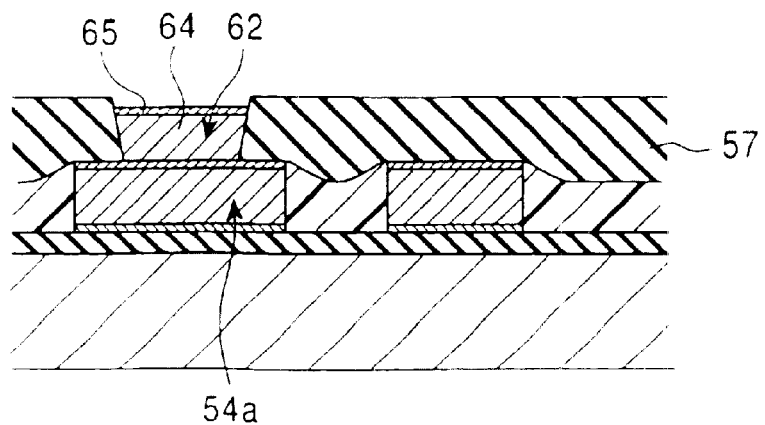
FIG. 23 is a drawing showing the step after the step shown in FIG. 22.
Figure 24:
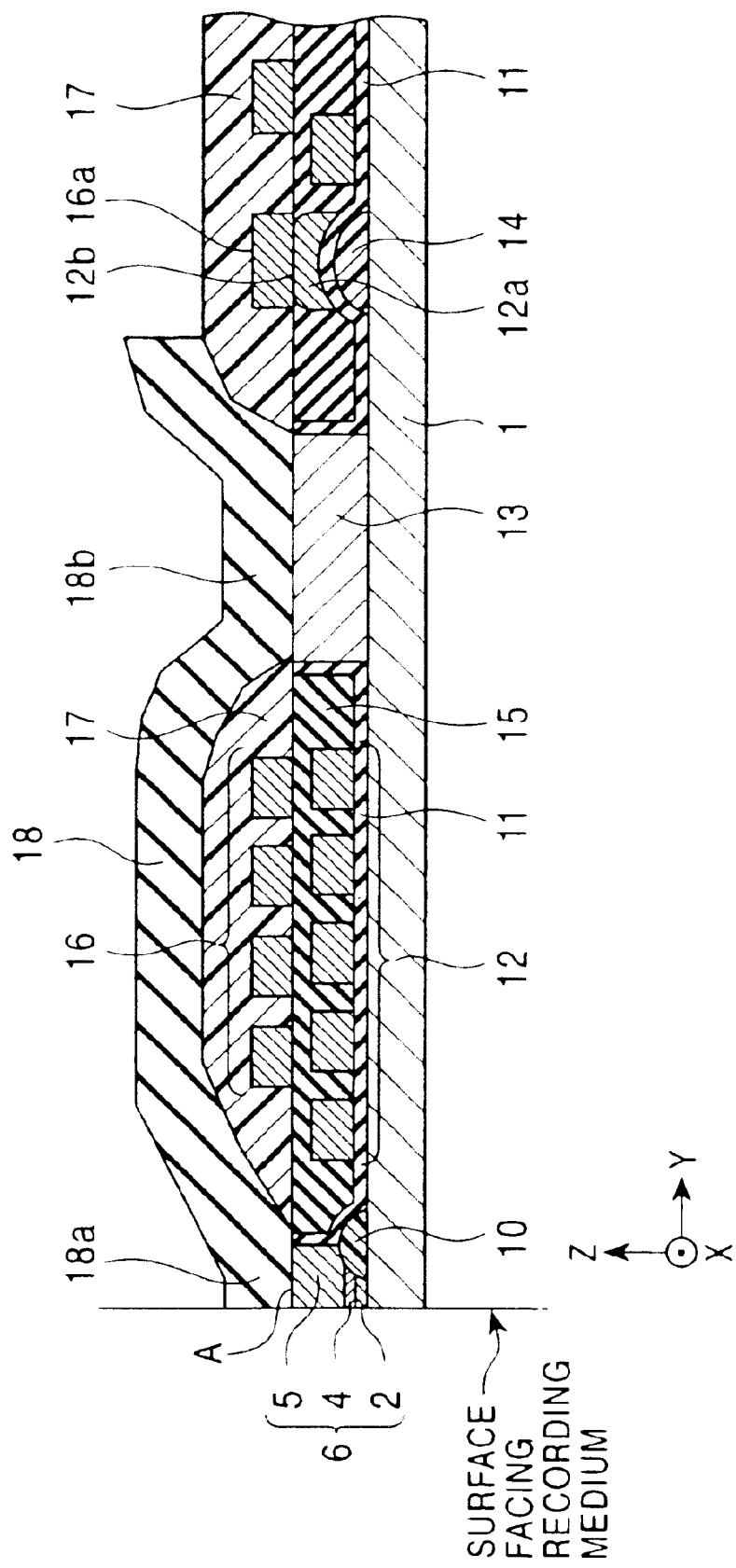
FIG. 24 is a longitudinal partial sectional view of a conventional thin film magnetic head.
Figure 25:
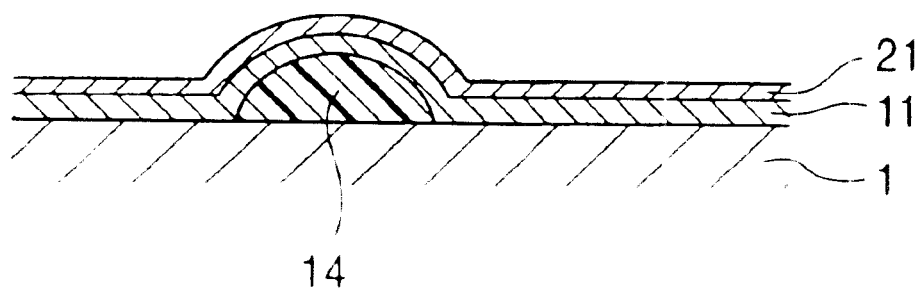
FIG. 25 is a drawing showing a step of a method of producing the conductive connection structure between the coil layers shown in FIG. 24.
Figure 26:
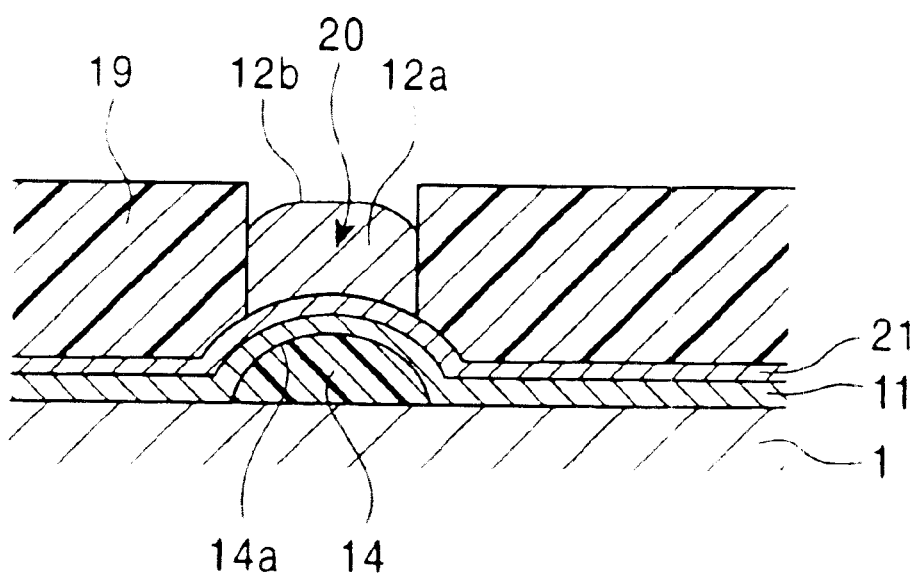
FIG. 26 is a drawing showing the step after the step shown in FIG. 25.
Figure 27:
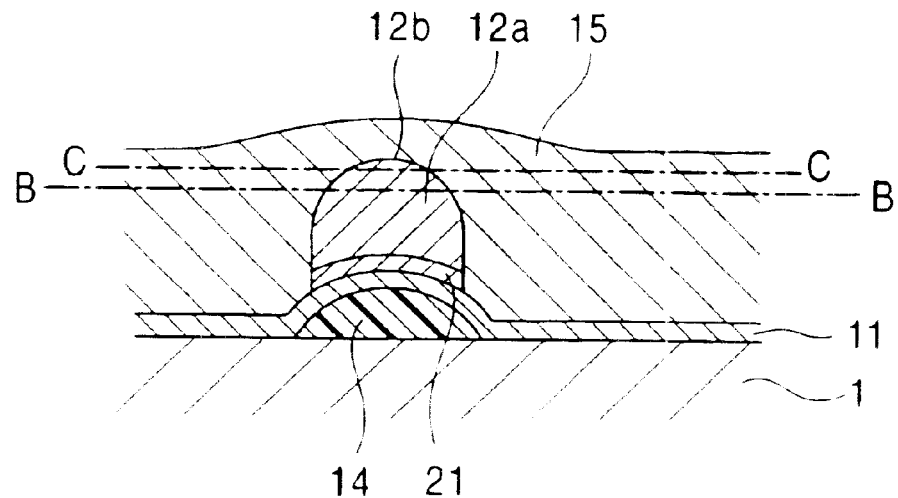
FIG. 27 is a drawing showing the step after the step shown in FIG. 26.
Figure 28:
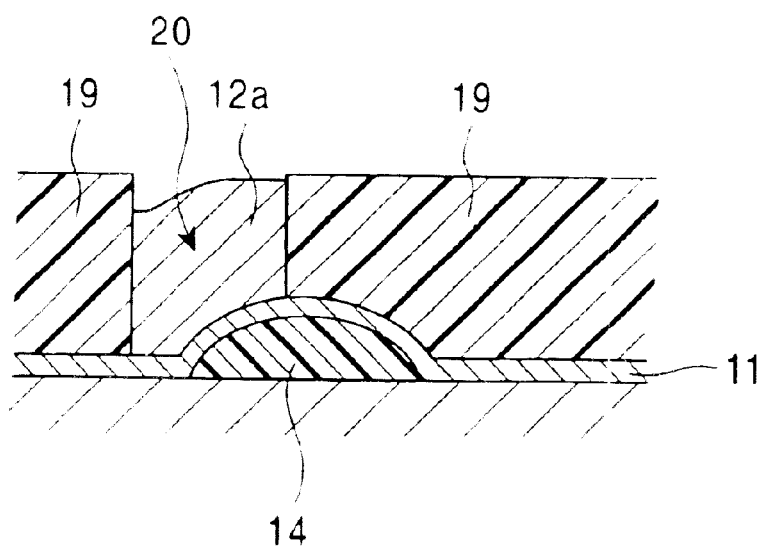
FIG. 28 is a drawing showing a problem of the method of producing the conductive connection structure between the coil layers shown in FIG. 24.

FIGS. 21 to 23 show steps of the method of manufacturing the conductive connection structure shown in FIG. 5.

In the step shown in FIG. 21, the intervals of the conductor of the first coil layer 54 formed on the coil insulating under layer 53 are filled with the insulating layer 56 made of an organic insulating material such as a resist or the like, and then the coil insulating layer 57 is formed on the insulating layer 56 and the first coil layer 54 by sputtering. As shown in FIG. 21, the first coil layer 54 is formed in the three-layer structure comprising, for example, the plating under layer 63, the conductive material layer 64 and the conductive protecting layer 65, which are laminated in order from the bottom.

The upper surface 57a of the coil insulating layer 57 is planarized by the polishing step using the CMP technique, as shown in FIG. 17.

In the step shown in FIG. 22, a resist layer 76 is formed on the upper surface 57a of the coil insulating layer 57, and then an aperture pattern 76a is formed in the resist layer 76 at the position opposite to the coil center 54a of the first coil layer 54. In this step, the resist layer 76 is heat-treated to slightly incline the side surfaces 76b of the aperture pattern 76a.

Then, the portion 57b of the insulating layer 57, which is exposed in the aperture pattern 76a, is removed by etching. In the etching step, the coil center 54a of the first coil layer 54 is exposed. In this step, the conductive protecting layer formed on the surface of the coil center 54a is preferably partially left to prevent etching of the conductive material layer 64 formed below the conductive protecting layer 65.

In the step shown in FIG. 23, the first contact portion 62 is formed on the coil center 54a. The first contact portion 62 preferably has the laminated plated structure comprising the conductive material layer 64 and the conductive protecting layer 65.

Next, the oxide layer formed on the conductive protecting layer 65 of the first contact portion 62 is removed, and then the second coil layer 58 is formed on the coil insulating layer 57 by plating in the same manner as shown in FIG. 19. In this step, the coil center 58a of the second coil layer 58 is formed on the first contact portion 62 to be conductively connected thereto.

Then, the second coil layer 58 is coated with the insulating layer 59 in the same manner as shown in FIG. 19, and the upper core layer 60 is further formed in the same manner as shown in FIG. 20.

This manufacturing method is capable of forming the first contact portion 62 on the coil center 54a of the planarized first coil layer 54, and thus forming the upper surface of the first contact portion 62 in a planarized surface.

In the step shown in FIG. 22, both side surfaces 76b of the aperture pattern 76a formed in the resist layer 76 are inclined, and thus the both side surfaces of the first contact portion 62 are also easily inclined (refer to FIG. 23), thereby easily causing variation in the area of the upper surface of the first contact portion 62 according to the height dimension thereof. However, it is preferable to prevent inclination of both side surfaces of the first contact portion 62 as much as possible. The inclination can be improved by using anisotropic etching for etching the coil insulating layer 57 in the step shown in FIG. 22, or controlling the curing temperature of the resist layer 76 shown in FIG. 22 to prevent inclination of both side surfaces 76b of the aperture pattern 76a as much as possible.

Even when both side surfaces of the first contact portion 62 are inclined, by appropriately controlling the plating time, the height dimension of the first contact portion 62 can be set to a predetermined value by appropriately controlling the plating time, and the exposed area of the upper surface 62a of the first contact portion 62 can be maintained in the predetermined range.

Next, in the present invention, the first coil lead layer 33 shown in FIGS. 2 or 7 can be formed by plating at a distance from the first coil layer 54 by the same method as shown in FIG. 12, and the second contact portion 68 can be formed on the coil connection end 33a of the first coil lead layer 33 by the same method as shown in FIGS. 13 to 16 or 21 to 23.

In the step of forming the second coil layer 58 shown in FIG. 19, the coil end 58b of the second coil layer 58 can be conductively connected to the second contact portion 68.

In the present invention, the third contact portion 71 can be formed by plating on the external connection end 34a of the second coil lead layer 34 integrally formed to extend from the coil end of the first coil layer 54 shown in FIG. 2 and/or the external connection end 33b of the first coil layer 33 by the same method as shown in FIGS. 13 to 16 or 21 to 23.

Then, during the step of forming the upper core layer 60 shown in FIG. 20, the raised layer 72 is formed on the third contact portion 71 shown in FIG. 8, the bump 37 is formed on the raised layer 72, and the external connection end 38 is further formed on the surface of the bump 37, which is exposed from the upper surface of the protecting layer 61.

In the present invention, during the step of forming the first coil layer 54 shown in FIG. 12, the electrode lead layers 35 and 36 shown in FIG. 2 or 9 can be formed by plating at a distance from the first coil layer 54, and the fourth contact portion 73 can be formed on the external connection ends 35a and 36a of the electrode lead layers 35 and 36 by plating by the same method as shown in FIGS. 13 to 16 or 21 to 23.

Then, during the step of forming the upper core layer 60 shown in FIG. 20, the raised layer 72 is formed on the fourth contact portion 73 shown in FIG. 9, the bump 39 is formed on the raised layer 72, and the external connection end 40 is further formed on the surface of the bump 39, which is exposed from the upper surface of the protecting layer 61.

Like the first contact portion 62, each of the second contact portion 68, the third contact portion 71 and the fourth contact portion 73 is preferably formed in the laminated plated structure comprising the conductive material layer 64 and the conductive protecting layer 65.

In the present invention, like the first coil layer 54, each of the first coil lead layer 33 and the electrode lead layers 35 and 36 is preferably formed in the three-layer plated structure comprising the plating under layer 63, the conductive material layer 64 and the conductive protecting layer 65, which are laminated in turn from the bottom.

As described above, in the present invention, the first contact portion 62, the second contact portion 68, the third contact portion 71 and the fourth contact portion 73 can be formed by plating in the same manufacturing step, thereby decreasing the number of the manufacturing steps and improving manufacturing efficiency.

As described above, in the present invention, the coil centers of first and second coil layers are conductively connected through a first contact portion.

In the present invention, the coil center of the first coil layer is formed on a planarized surface, and thus the upper surface of the coil center can be formed in a planarized surface.

Therefore, the first contact portion can readily be formed in a shape such as a rectangular or cylindrical shape, which has a constant horizontal sectional area, and thus the exposed area of the upper surface of the first contact portion, which is exposed from the upper surface of a coil insulating layer by polishing, can be maintained substantially constant.

Therefore, the present invention can improve conductivity between the first contact portion and the coil center of a second coil layer conductively connected thereto, and obtain stable DC resistance.

The manufacturing method of the present invention is capable of easily forming conductive connection in the first contact portion between the coil layers by a small number of steps, and forming conductive connection between an electrode lead and a bump, for example, in an MR head during the step of conductively connecting the coil layers, thereby simplifying the manufacturing process.

What is claimed is:

1. A thin film magnetic head comprising a coil layer provided between lower and upper core layers, for inducing a recording magnetic field in each of the core layers;

wherein the coil layer comprises a first coil layer and a second coil layer formed on the first coil layer with a coil insulating layer provided therebetween;

wherein the coil center of the first coil layer is formed on a planarized surface, a first contact portion is formed by plating on the coil center of the first coil layer to pass through the coil insulating layer, and the coil center of the second coil layer is conductively connected to the upper surface of the first contact portion exposed from the upper surface of the coil insulating layer; and wherein a first coil lead layer is formed at a distance from the first coil layer, a second contact portion is formed by plating on a coil connection end of the first coil layer so as to pass through the coil insulating layer, and the coil end of the second coil layer is conductively connected to the second contact portion.

2. A thin film magnetic head according to claim 1, further comprising a pole portion which is formed between the upper and lower core layers at a surface facing a recording medium, and which comprises at least a nonmagnetic gap layer and an upper pole layer formed between the gap layer and the upper core layer;

wherein assuming that the joint surface between the pole portion and the upper core layer is a reference plane, the first coil layer is located behind the pole portion in the height direction, the upper surface of the first coil layer is lower than the reference plane, and the upper surface of the coil insulating layer formed on the first coil layer is coplanar with the reference plane.

3. A thin film magnetic head according to claim 1, wherein the upper surface of the first contact portion is formed to be coplanar with the upper surface of the coil insulating layer.

4. A thin film magnetic head according to claim 1, wherein the upper surface of the second contact portion is formed to be coplanar with the upper surface of the coil insulating layer.

5. A thin film magnetic head according to claim 1, wherein at least one of the first and second contact portions has a constant sectional area taken along the direction parallel to the upper surface of the lower core layer.

6. A thin film magnetic head according to claim 1, wherein at least one of the first and second contact portions is formed by plating a conductive material layer and a conductive protecting layer of predetermined thickness, which is deposited on the conductive material layer and has no oxide layer on the surface thereof, or plating the conductive material layer with no oxide layer on the surface thereof.

7. A thin film magnetic head according to claim 6, wherein the conductive material layer comprises a single layer structure or multilayer structure containing one or two of the elements, Cu, Au and Ag, and the conductive protecting layer comprises a single layer structure or multilayer structure containing at least one of the elements, Ni, Cr, P, Pd, Pt, B and W.

8. A thin film magnetic head according to claim 1, wherein any one of the first coil layer, the second coil layer and the first coil lead layer is formed by plating a conductive material layer and a conductive protecting layer of predetermined thickness, which is deposited on the conductive material layer and has no oxide layer on the surface thereof, or plating the conductive material layer with no oxide layer on the surface thereof.

9. A thin film magnetic head according to claim 8, wherein the conductive material layer comprises a single layer structure or multilayer structure containing one or two of elements, Cu, Au and Ag, and the conductive protecting layer comprises a single layer structure or multilayer structure containing at least one of elements, Ni, Cr, P, Pd, Pt, B and W.

10. A thin film magnetic head comprising a coil layer provided between lower and upper core layers, for inducing a recording magnetic field in each of the core layers;
   wherein the coil layer comprises a first coil layer and a second coil layer formed on the first coil layer with a coil insulating layer provided therebetween;
   wherein the coil center of the first coil layer is formed on a planarized surface, a first contact portion is formed by plating on the coil center of the first coil layer to pass through the coil insulating layer, and the coil center of the second coil layer is conductively connected to the upper surface of the first contact portion exposed from the upper surface of the coil insulating layer; and
   wherein a first coil lead layer is formed at a distance from the first coil layer, a second coil lead layer is formed integrally with the coil end of the first coil layer, a second contact portion is formed by plating on the external connection end of the first coil lead layer and/or the external connection end of the second coil lead layer so as to pass through the coil insulating layer, and a bump is formed on the second contact portion directly or through another layer.

11. A thin film magnetic head according to claim 10, further comprising a pole portion which is formed between the upper and lower core layers at a surface facing a recording medium, and which comprises at least a nonmagnetic gap layer and an upper pole layer formed between the gap layer and the upper core layer;
   wherein assuming that the joint surface between the pole portion and the upper core layer is a reference plane, the first coil layer is located behind the pole portion in the height direction, the upper surface of the first coil layer is lower than the reference plane, and the upper surface of the coil insulating layer formed on the first coil layer is coplanar with the reference plane.

12. A thin film magnetic head according to claim 10, wherein the upper surface of the first contact portion is formed to be coplanar with the upper surface of the coil insulating layer.

13. A thin film magnetic head according to claim 10, wherein the upper surface of the second contact portion is formed to be coplanar with the upper surface of the coil insulating layer.

14. A thin film magnetic head according to claim 10, wherein at least one of the first and second contact portions has a constant sectional area taken along the direction parallel to the upper surface of the lower core layer.

15. A thin film magnetic head according to claim 10, wherein at least one of the first and second contact portions is formed by plating a conductive material layer and a conductive protecting layer of predetermined thickness, which is deposited on the conductive material layer and has no oxide layer on the surface thereof, or plating the conductive material layer with no oxide layer on the surface thereof.

16. A thin film magnetic head according to claim 15, wherein the conductive material layer comprises a single layer structure or multilayer structure containing one or two of the elements, Cu, Au and Ag, and the conductive protecting layer comprises a single layer structure or multilayer structure containing at least one of the elements, Ni, Cr, P, Pd, Pt, B and W.

17. A thin film magnetic head according to claim 10, wherein any one of the first coil layer, the second coil layer, the first coil lead layer and the second coil lead layer is formed by plating a conductive material layer and a conductive protecting layer of predetermined thickness, which is deposited on the conductive material layer and has no oxide layer on the surface thereof, or plating the conductive material layer with no oxide layer on the surface thereof.

18. A thin film magnetic head according to claim 17, in the conductive material layer comprises a single layer structure or multilayer structure containing one or two of elements, Cu, Au and Ag, and the conductive protecting layer comprises a single layer structure or multilayer structure containing at least one of elements, Ni, Cr, P, Pd, Pt, B and W.

19. A thin film magnetic head comprising a coil layer provided between lower and upper core layers, for inducing a recording magnetic field in each of the core layers, and further comprising a reproducing magnetoresistive element provided below the lower core layer to serve as a combination-type thin film magnetic head;
   wherein the coil layer comprises a first coil layer and a second coil layer formed on the first coil layer with a coil insulating layer provided therebetween;
   wherein the coil center of the first coil layer is formed on a planarized surface, a first contact portion is formed by plating on the coil center of the first coil layer to pass through the coil insulating layer, and the coil center of the second coil layer is conductively connected to the upper surface of the first contact portion exposed from the upper surface of the coil insulating layer; and
   wherein an electrode lead layer for supplying a sensing current to the magnetoresistive element is formed at a distance from the first coil layer, a second contact portion is formed by plating on the external connection end of the electrode lead layer so as to pass through the coil insulating layer, and a bump is formed on the second contact portion directly or through another layer.

20. A thin film magnetic head according to claim 19, further comprising a pole portion which is formed between the upper and lower core layers at a surface facing a recording medium, and which comprises at least a nonmagnetic gap layer and an upper pole layer formed between the gap layer and the upper core layer;
   wherein assuming that the joint surface between the pole portion and the upper core layer is a reference plane, the first coil layer is located behind the pole portion in the height direction, the upper surface of the first coil layer is lower than the reference plane, and the upper surface of the coil insulating layer formed on the first coil layer is coplanar with the reference plane.

21. A thin film magnetic head according to claim 19, wherein the upper surface of the first contact portion is formed to be coplanar with the upper surface of the coil insulating layer.

22. A thin film magnetic head according to claim 19, wherein the upper surface of the second contact portion is formed to be coplanar with the upper surface of the coil insulating layer.

23. A thin film magnetic head according to claim 19, wherein at least one of the first and second contact portions has a constant sectional area taken along the direction parallel to the upper surface of the lower core layer.

24. A thin film magnetic head according to claim 19, wherein at least one of the first and second contact portions is formed by plating a conductive material layer and a conductive protecting layer of predetermined thickness, which is deposited on the conductive material layer and has no oxide layer on the surface thereof, or plating the conductive material layer with no oxide layer on the surface thereof.

25. A thin film magnetic head according to claim 24, wherein the conductive material layer comprises a single layer structure or multilayer structure containing one or two of the elements, Cu, Au and Ag, and the conductive protecting layer comprises a single layer structure or multilayer structure containing at least one of the elements, Ni, Cr, P, Pd, Pt, B and W.

26. A thin film magnetic head according to claim 19, wherein any one of the first coil layer, the second coil layer and the electrode lead layer is formed by plating a conductive material layer and a conductive protecting layer of predetermined thickness, which is deposited on the conductive material layer and has no oxide layer on the surface thereof, or plating the N conductive material layer with no oxide layer on the surface thereof.

27. A thin film magnetic head according to claim 26, wherein the conductive material layer comprises a single layer structure or multilayer structure containing one or two of elements, Cu, Au and Ag, and the conductive protecting layer comprises a single layer structure or multilayer structure containing at least one of elements, Ni, Cr, P. Pd, Pt, B and W.

* * * * *

UNITED STATES PATENT AND TRADEMARK OFFICE
CERTIFICATE OF CORRECTION

PATENT NO. : 6,894,870 B2  
DATED : May 17, 2005  
INVENTOR(S) : Toru Takahashi et al.

Page 1 of 1

It is certified that error appears in the above-identified patent and that said Letters Patent is hereby corrected as shown below:

<u>Column 30,</u>  
Line 12, after "or plating the" delete "N".  
Line 19, after "Ni, Cr," delete "P." and substitute -- P, -- in its place.

Signed and Sealed this

Second Day of May, 2006

JON W. DUDAS  
*Director of the United States Patent and Trademark Office*